US010977816B2

(12) United States Patent
Sano

(10) Patent No.: US 10,977,816 B2
(45) Date of Patent: Apr. 13, 2021

(54) IMAGE PROCESSING APPARATUS, IMAGE PROCESSING PROGRAM, AND DRIVING ASSISTANCE SYSTEM

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Toru Sano, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 59 days.

(21) Appl. No.: 16/292,157

(22) Filed: Mar. 4, 2019

(65) Prior Publication Data

US 2020/0082556 A1    Mar. 12, 2020

(30) Foreign Application Priority Data

Sep. 12, 2018    (JP) .............................. JP2018-170863

(51) Int. Cl.
*G06T 7/00*        (2017.01)
*G06T 7/593*      (2017.01)
(Continued)

(52) U.S. Cl.
CPC ............ *G06T 7/593* (2017.01); *G06T 3/4007* (2013.01); *G06T 5/009* (2013.01); *G06T 7/74* (2017.01);
(Continued)

(58) Field of Classification Search
CPC ......... G06T 7/593; G06T 7/74; G06T 3/4007; G06T 5/009; G06T 2207/10012; G06T 2207/20228; G06T 2207/30252
See application file for complete search history.

(56) References Cited

U.S. PATENT DOCUMENTS 5,825,924 A    10/1998  Kobayashi
8,248,494 B2    8/2012  Du et al.
(Continued)

FOREIGN PATENT DOCUMENTS

JP      2007293900 A    11/2007
JP         4080942 B2     4/2008
(Continued)

OTHER PUBLICATIONS

Michael et al. "Real-time Stereo Vision: Optimizing Semi-Global Matching," IEEE Intelligent Vehicles Symposium (IV), Jun. 23-26, 2013, Gold Coast, QLD, Australia, 7 pages.

(Continued)

*Primary Examiner* — Khai M Nguyen
(74) *Attorney, Agent, or Firm* — Kim & Stewart LLP

(57) ABSTRACT

An image processing apparatus includes a calculation circuit configured to calculate a disparity between images, a determination circuit configured to determine a pixel position at which intensive disparity retrieval is to be performed based on distribution statistics of the disparity, an interpolation circuit configured to generate an interpolated image by performing interpolation at pixel positions at which intensive disparity retrieval is to be performed, and an output circuit configured to output a corrected disparity with which the distance to the object is determined. The calculation circuit calculates a first disparity based on the first and second images and generate distribution statistics from the first disparity in the first image, and calculates a second disparity based on the second image and the interpolated image generated from the first image by the interpolation circuit. The output circuit generates the corrected disparity based on differences between the first and second disparities.

16 Claims, 13 Drawing Sheets

(51) Int. Cl.
*G06T 7/73* (2017.01)
*G06T 3/40* (2006.01)
*G06T 5/00* (2006.01)

(52) U.S. Cl.
CPC ............... *G06T 2207/10012* (2013.01); *G06T 2207/20228* (2013.01); *G06T 2207/30252* (2013.01)

(56) References Cited

U.S. PATENT DOCUMENTS

| | | | |
|---|---|---|---|
| 8,619,082 B1* | 12/2013 | Ciurea | ............... G02B 27/0075 345/427 |
| 9,275,463 B2 | 3/2016 | Nanri et al. | |
| 9,538,081 B1* | 1/2017 | Zhou | ....................... H04N 13/25 |
| 9,704,253 B2 | 7/2017 | Lange et al. | |
| 2004/0002612 A1 | 1/2004 | Sumida et al. | |
| 2012/0327189 A1* | 12/2012 | Muramatsu | .............. G01C 3/06 348/46 |
| 2017/0163960 A1 | 6/2017 | Nagata et al. | |

FOREIGN PATENT DOCUMENTS

| | | |
|---|---|---|
| JP | 5320524 B1 | 10/2013 |
| JP | 2016099318 A | 5/2016 |

OTHER PUBLICATIONS

Hirschmüller, Heiko: "Stereo Processing by Semi-Global Matching and Mutual Information", IEEE Transactions on Pattern Analysis and Machine Intelligence, vol. 30, No. 2, Feb. 1, 2008, 14 pages.
Extended European Search Report dated Jun. 27, 2019 in corresponding European Patent Application No. 19159669.1, 8 pages.

* cited by examiner

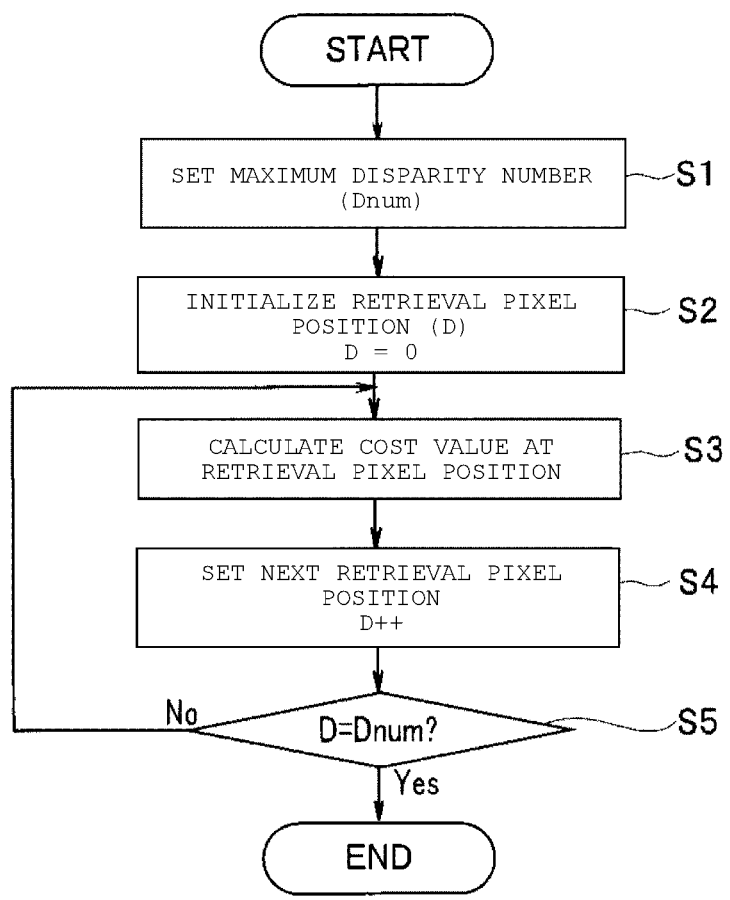

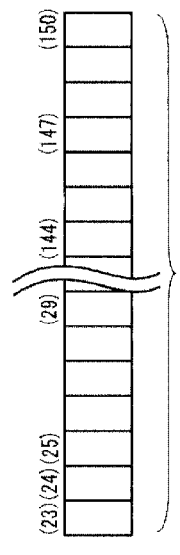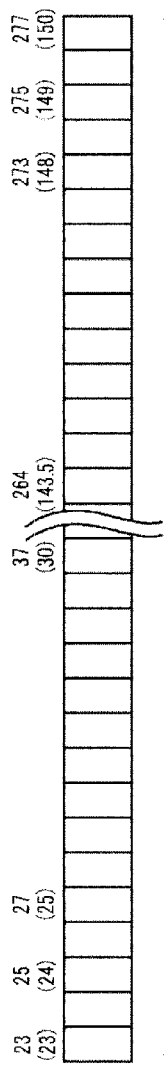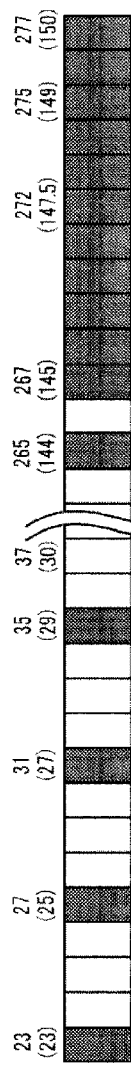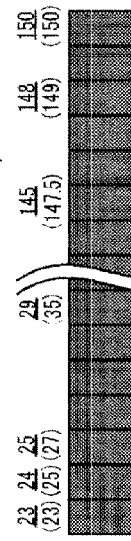

IMAGE PROCESSING APPARATUS, IMAGE PROCESSING PROGRAM, AND DRIVING ASSISTANCE SYSTEM

CROSS-REFERENCE TO RELATED APPLICATION

This application is based upon and claims the benefit of priority from Japanese Patent Application No. 2018-170863, filed Sep. 12, 2018, the entire contents of which are incorporated herein by reference.

FIELD

Embodiments described herein relate generally to an image processing apparatus, an image processing program, and a driving assistance system.

BACKGROUND

When a subject is imaged by stereo cameras which are horizontally arranged, positions of the subject in the two captured images are deviated in the horizontal direction due to a difference between the camera positions. The difference between the positions of the subject in both images is referred to as "disparity". It is known that a distance from a camera to a subject is proportional to an inverse number of a disparity. In other words, the disparity becomes smaller as the distance becomes longer, and becomes larger as the distance becomes shorter, and a distance resolution at a distant location is reduced more than in the vicinity.

As a method for increasing a distance resolution at a distant location, sub-pixel calculation based on disparity computation is proposed. When the sub-pixel calculation is performed on the entire screen in order to increase the distance resolution at the distant location, the process for improving the resolution is also performed on a subject at a short distance, which originally does not require improving a distance resolution, and thus the entire computation amount becomes considerably large. There is a method in which the disparity is calculated in the integer unit, and then sub-pixel calculation is performed on pixels before and after the disparity, but, also in this case, the calculation amount is considerably large.

For increasing the distance resolution, another method is proposed in which polygonal line fitting or parabola fitting is performed on a cost value, which is discretely calculated in the pixel unit. In this method, a value which is less than an integer can be estimated. However, it is necessary to reduce a pixel locking phenomenon in which an estimation result after the decimal point is biased to the vicinity of an integer position, and thus computation becomes complex. Even if the pixel locking phenomenon is reduced by improving a fitting function, the bias may still remain.

DESCRIPTION OF THE DRAWINGS

FIG. 4 is a flowchart illustrating a cost value calculation procedure in the cost-value calculation circuit.

FIGS. 8A to 8D are diagrams illustrating a method of determining a cost value calculation target pixel in an intensive disparity range determination circuit.

DETAILED DESCRIPTION

Embodiments provide an image processing apparatus, an image processing program, and a driving assistance system capable of improving the accuracy of disparity calculation.

In general, according to one embodiment, an image processing apparatus which calculates a disparity on the basis of first and second images for use in determining a distance to an object in the first and second images is provided. The apparatus comprises a calculation circuit configured to calculate a disparity between images, a determination circuit configured to determine a pixel position at which intensive disparity retrieval is to be performed based on distribution statistics of the disparity, an interpolation circuit configured to generate an interpolated image by performing interpolation at pixel positions at which intensive disparity retrieval is to be performed, and an output circuit configured to output a corrected disparity with which the distance to the object is determined. The calculation circuit is configured to calculate a first disparity based on the first and second images and generate distribution statistics from the first disparity in the first image, and calculate a second disparity based on the second image and the interpolated image generated from the first image by the interpolation circuit. The output circuit is configured to generate the corrected disparity based on differences between the first disparity and the second disparity.

Hereinafter, embodiments will be described with reference to the drawings.

First Embodiment

Figure 1:
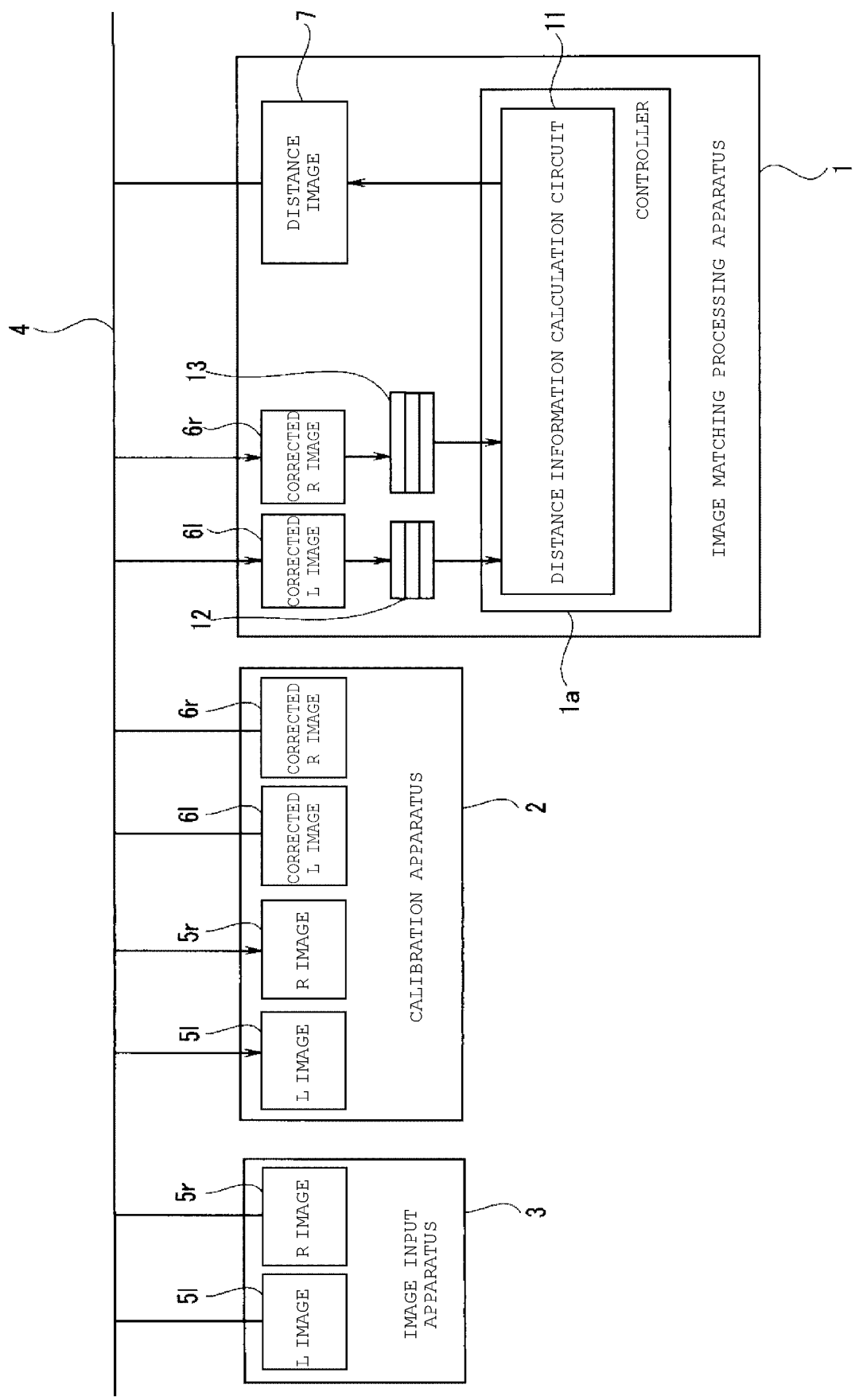
FIG. 1 is a schematic block diagram illustrating an image processing system including an image processing apparatus according to an embodiment.

FIG. 1 is a schematic block diagram illustrating an example of an image processing system including an image processing apparatus 1 according to the present embodiment. The image processing system includes an image matching processing apparatus (hereinafter, referred to as an image processing apparatus) 1, a calibration apparatus 2, an image input apparatus 3, and a bus 4 via which the above-described elements are connected to each other. FIG. 1 illustrates an image processing system which performs a stereo matching process by using left and right disparity images obtained by two cameras.

A plurality of images (for example, two images such as an L image 5*l* captured by a camera corresponding to the left eye and an R image 5*r* captured by a camera corresponding to the right eye) captured by the cameras (not illustrated) are input to the image input apparatus 3. The L image 5*l* and the R image 5*r* are input to the calibration apparatus 2 via the bus 4.

The calibration apparatus 2 corrects a static deviation between the inside and the outside of a camera, caused by setting conditions or an individual difference of a lens. Specifically, internal parameters and external parameters are calculated in advance by using a captured image of a specific graphic pattern of which a size is known, such as a latticed pattern. The L image 5*l* and the R image 5*r* which are input from the image input apparatus 3 are converted by using the internal parameters and the external parameters such that a static deviation is corrected, and thus a corrected L image 6*l* and a corrected R image 6*r* are generated. The internal parameters are parameters such as a focal length, an image principal point position, and a lens distortion, indicating camera internal characteristics. The external parameters are parameters regarding rotational and parallel movement in a three-dimensional space of a camera. In stereo images, the external parameters indicate the extent of rotational and parallel movement of the other image when one image is used as a standard image. The corrected L image 6*l* and the corrected R image 6*r* are input to the image processing apparatus 1 via the bus 4.

The image processing apparatus 1 performs stereo matching by using the corrected images (that is, the corrected L image 6*l* and the corrected R image 6*r*), so as to generate a distance image 7, which indicates a distance from the camera to a subject. The image processing apparatus 1 in FIG. 1 includes a controller 1*a* including a processor, an L image line buffer (hereinafter, referred to as an L line buffer) 12 and an R image line buffer (hereinafter, referred to as an R line buffer) 13.

The L line buffer 12 is a buffer storing pixel data corresponding to a plurality of lines including a line of a disparity computation target pixel position in the corrected L image 6*l*. The R line buffer 13 is a buffer storing pixel data corresponding to a plurality of lines including a line of a disparity computation target pixel position in the corrected R image 6*r*.

The controller 1*a* includes a distance information calculation circuit 11. The distance information calculation circuit 11 calculates a disparity for each pixel of a standard image by using global matching such as a graph cut method, or an SGM method, and outputs a disparity image. A left image and a right image are replaced with each other as a standard image, and thus crosscheck is performed. In other words, each process in the distance information calculation circuit 11 is performed by the controller 1*a*.

The term "processor" used in the present embodiment indicates, for example, a circuit of a central processing unit (CPU), a graphical processing unit (GPU), an application specific integrated circuit (ASIC), a programmable logic device (for example, a simple programmable logic device (SPLD)), a complex programmable logic device (CPLD), or a field programmable gate array (FPGA).

Figure 2:
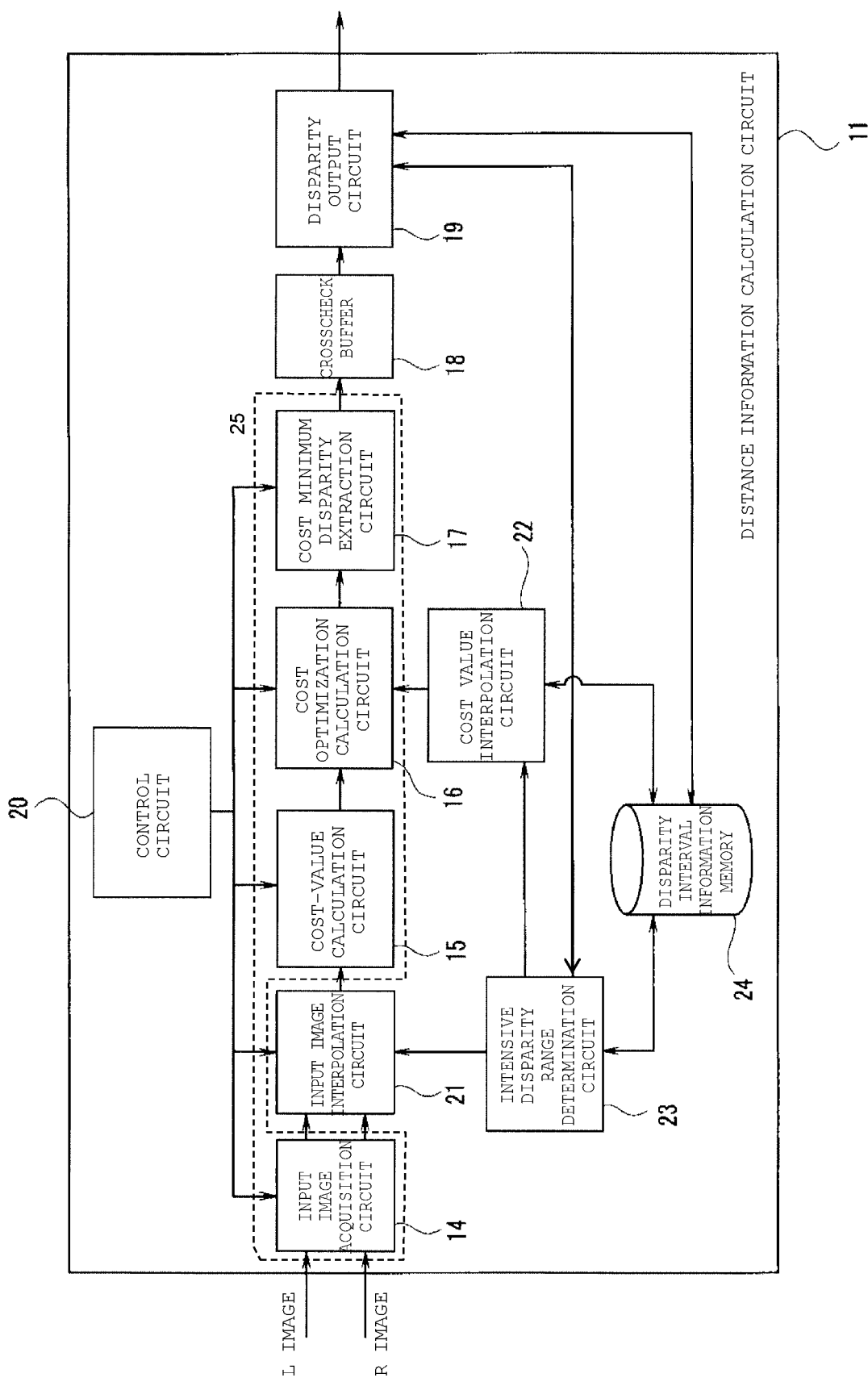
FIG. 2 is a block diagram illustrating a configuration of a distance information calculation circuit.

FIG. 2 is a block diagram illustrating a configuration of the distance information calculation circuit 11. The distance information calculation circuit 11 includes an input image acquisition circuit 14, an input image interpolation circuit 21, a cost-value calculation circuit 15, a cost optimization calculation circuit 16, a cost minimum disparity extraction circuit 17, a crosscheck buffer 18, a disparity output circuit 19 (also referred to as the output circuit), an intensive disparity range determination circuit 23 (also referred to as the determination circuit), a cost value interpolation circuit 22, a disparity interval information memory 24, and a control circuit 20. Additionally, the input image acquisition circuit 14, the cost-value calculation circuit 15, the cost optimization calculation circuit 16, and the cost minimum disparity extraction circuit 17 are also referred to as simply the calculation circuit 25.

The input image acquisition circuit 14 acquires each pixel data of a standard image and each pixel data of a reference image from the L line buffer 12 and the R line buffer 13 in response to an instruction from the control circuit 20. When each pixel data is acquired, the control circuit 20 gives an instruction for an L image or an R image to be used as a standard image and for a pixel acquisition order (that is, a direction of raster scanning).

The input image interpolation circuit 21 interpolates a reference image among input images which are input from the input image acquisition circuit 14, so as to generate an interpolation image, in response to an instruction received from the intensive disparity range determination circuit 23. Specifically, first, a designated region in an input image is expanded only in the horizontal direction, and a resolution is increased in a state in which integer accuracy is maintained. A super resolution method such as a bilinear method or a bi-cubic method is used to expand an image. When the entire input image is expanded to twice in resolution, the number of pixels in the horizontal direction are approximately doubled. For example, when all pixels are doubled in the horizontal direction with respect to an input image in which the number of horizontal pixels is 1280 pixels, the number of horizontal pixels of an interpolation image is 2559 pixels.

Next, a cost value calculation pixel is extracted in response to an instruction received from the intensive disparity range determination circuit 23. The number of cost value calculation pixels is set to be the same as the number of pixels of an extension target region in the input image. For example, when the number of pixels of an extension target region is 128 pixels, the number of cost value calculation pixels is also set to 128 pixels. Finally, pixels other than the cost value calculation target pixels are deleted from a pixel region which is generated by expanding the designated region, and thus an interpolation image is generated. When there is no instruction from the intensive disparity range determination circuit 23, the input image is output as an interpolation image without being changed.

The cost-value calculation circuit 15 sets a cost value calculation pixel region for a disparity computation target pixel in the interpolation image, and calculates a cost value in the region. The cost value calculation pixel region has a size of the maximum disparity in the horizontal direction. In the following description, a coordinate indicating a pixel position in the horizontal direction in the interpolation image will be referred to as an X coordinate, and a coordinate indicating a pixel position in the vertical direction will be referred to as a Y coordinate. For example, when a standard image is an L image, a position of a disparity computation target pixel is (X,Y)=(150,25), and the maximum disparity in the horizontal direction is 128 pixels, a cost value calculation pixel region includes pixels in the range of (X,Y)=(150,25) to (23,25).

Figure 3:
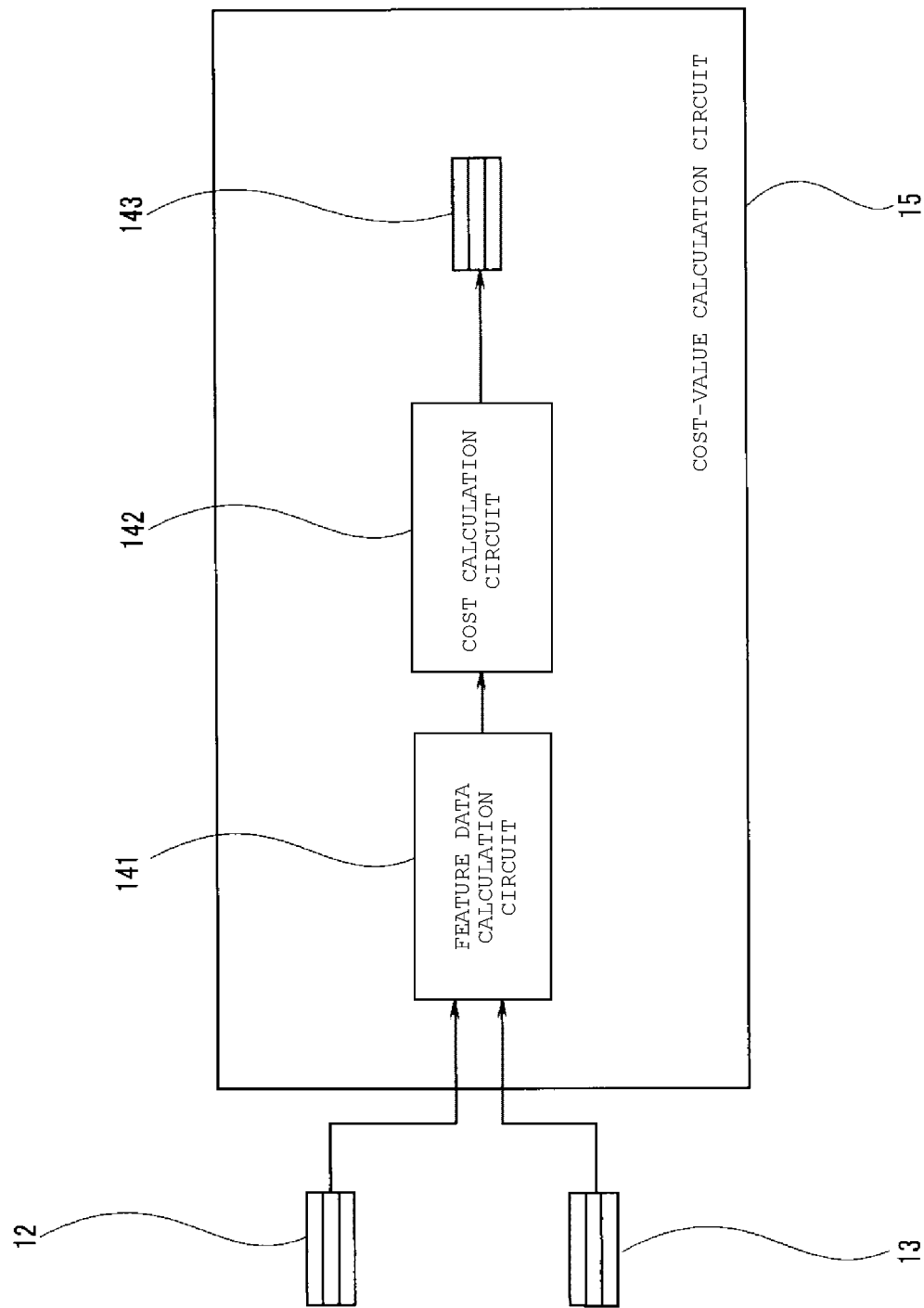
FIG. 3 is a block diagram illustrating a detailed configuration of a cost-value calculation circuit.

FIG. 3 is a block diagram illustrating a detailed configuration of the cost-value calculation circuit 15. The cost-value calculation circuit 15 includes a feature data calculation circuit 141, a cost calculation circuit 142, and a cost buffer 143.

The feature data calculation circuit 141 calculates feature data of pixel data of a disparity computation target pixel acquired from the line buffer storing a standard image, and pixel data in a cost value calculation pixel region of an interpolation image acquired from the input image interpolation circuit 21, respectively. For example, existing quantified feature data such as a local binary pattern (LBP) is calculated. When an LBP is calculated as feature data, luminance values of a feature data calculation target pixel (e.g., a central pixel) and a peripheral pixel are compared with each other. When the luminance value of the peripheral pixel is greater than the luminance value of the central pixel, the bit of "1" is assigned, and, when the luminance value of the peripheral pixel is smaller than the luminance value of the central pixel, the bit of "0" is assigned. Bits of the peripheral pixel are coupled in a predetermined order, so as to be used as feature data (for example, an LBP code) of the feature data calculation target pixel. Regarding bits assigned to a peripheral pixel, when the luminance value of the peripheral pixel is greater than the luminance value of the central pixel, the bit of "0" may be assigned, and, when the luminance value of the peripheral pixel is smaller than the luminance value of the central pixel, the bit of "1" may be assigned.

The cost calculation circuit 142 compares feature data regarding the disparity computation target pixel in the standard image with feature data regarding the cost value calculation pixel in the interpolation image, so as to calculate a cost value for each disparity. For example, when an LBP code is calculated as feature data, a Hamming distance between LBP codes of the standard image and the reference image is calculated to be used as a cost value.

The cost buffer 143 stores the cost value calculated in the cost calculation circuit 142 in correlation with a pixel position in the interpolation image.

FIG. 4 is a flowchart illustrating an example of a cost value calculation procedure in the cost-value calculation circuit 15. Prior to calculation of a cost value, it is assumed that a disparity computation target pixel is set in a standard image, and feature data required to calculate a cost value is calculated in advance. It is necessary to calculate disparities for all pixels of the standard image in order to create the distance image 7. Typically, disparity computation target pixel positions are sequentially set in an order of raster scanning from a pixel located on an upper left part of the standard image to a pixel located on a lower right part, and a disparity at each pixel position is calculated.

First, a cost value calculation target region is specified, and the maximum disparity number Dnum in the horizontal direction is set (S1). For example, in the above example, Dnum=128 is set. An initial cost value calculation target pixel position (that is, a retrieval pixel position) is set. The initial cost value calculation target pixel position is a position of a pixel located at a left end of the cost value calculation target region. For example, in the above example, the initial cost value calculation target pixel position is set to (X,Y)=(23,25).

Next, the cost value calculation target pixel position in the horizontal direction is set to an initial state (that is, D=0) (S2). Next, a cost value at the retrieval pixel position is calculated in the cost calculation circuit 142, so as to be stored in the cost buffer 143 (S3). Next, a pixel position (D) in the horizontal direction is increased by 1 as the retrieval pixel position, and thus the retrieval pixel position is moved to an adjacent pixel (S4).

When the retrieval pixel position is included in the cost value calculation target region (No in S5), the flow returns to S3, and a cost value at the pixel position is calculated. On the other hand, when a moved retrieval pixel position is not included in the cost value calculation target region (Yes in S5), it is determined that calculation of cost values for all pixels in the cost value calculation target region is completed, and a series of cost value calculation procedures in the cost-value calculation circuit 15 is finished.

A cost value calculation method in the cost-value calculation circuit 15 is not limited to the procedure in the flowchart in FIG. 4, and any procedure may be used if cost values for all pixels in a cost value calculation target region can be calculated without being omitted. For example, a cost value calculation target region may be divided into a plurality of blocks, and cost values in the respective blocks may be calculated in parallel.

A cost value calculation method in the cost-value calculation circuit 15 is not limited to the above-described Hamming distance between LBP codes, and an existing quantified cost function such as an SAD function may be used. When using a method such as an SAD function in which a cost can be directly calculated without calculating feature data from pixel data, pixel data of a disparity computation target pixel acquired from the line buffer storing a standard image and pixel data in a cost value calculation pixel region acquired from an interpolation image can be directly input to the cost calculation circuit 142 in order to calculate a cost value, and thus the feature data calculation circuit 141 can be omitted.

The cost optimization calculation circuit 16 calculates a combined cost value S which is a combination dissimilarity according to global matching such as a graph cut method, or an SGM method, and thus derives a disparity optimized for each pixel of the standard image. The combined cost value S is a parameter that indicates a dissimilarity between a pixel region in a standard image and a pixel region in a reference image.

Here, a description will be made of a method of calculating the combined cost value S according to the SGM method. A plurality of paths are defined along a direction of being aggregated toward a disparity computation target pixel from end parts of an interpolation image, and the combined cost value S is calculated as a sum total of costs in the respective paths. As paths for calculating costs, typically, four paths along four directions of being aggregated from a horizontal right direction, a horizontal left direction, a vertical upper direction, and a vertical lower direction toward the disparity computation target pixel are set. Typically, in addition to the four directions, four paths along four directions of being aggregated from an upper right direction of 45 degrees, an upper left direction of 45 degrees, a lower left direction of 45 degrees, and an upper left direction of 45 degrees are added, and thus eight paths are set. Eight directions may be further divided into sixteen directions, each of the eight directions may be divided into three directions such that twenty-four directions are set, and the number of paths is not limited to a specific number.

A cost $Lr(p, d)$ in each path r is calculated by using the following Equation (1).

$$Lr(p,d)=C(p,d)+\min\{Lr(p-r,d),Lr(p-r,d-1)+P1,Lr(p-r,d+1)+P1,Lr\min(p-r)+P2\} \quad (1)$$

In Equation (1), C(p, d) indicates a cost value for a pixel at a position of a disparity d from the disparity computation target pixel position, min{ } indicates a function for obtaining the minimum value, and Lrmin(p−r) indicates the minimum value of Lr(p−r, d) when a shift amount d is changed at a coordinate obtained by shifting one pixel in an r direction from the disparity computation target pixel position. P1 and P2 are penalty constants set in advance. As mentioned above, the cost Lr(p, d) is a recurrence formula in which a value of a cost before one pixel on a predetermined path in the r direction is selected and is added to the cost value C(p, d), and thus optimization is performed.

The cost computation shown in Equation (1) is performed in a plurality of directions (for example, eight directions), and thus the overall optimization is approximately performed. In other words, a sum total of costs Lr(p, d) in the respective directions is calculated as the combined cost value S.

Figure 5B:
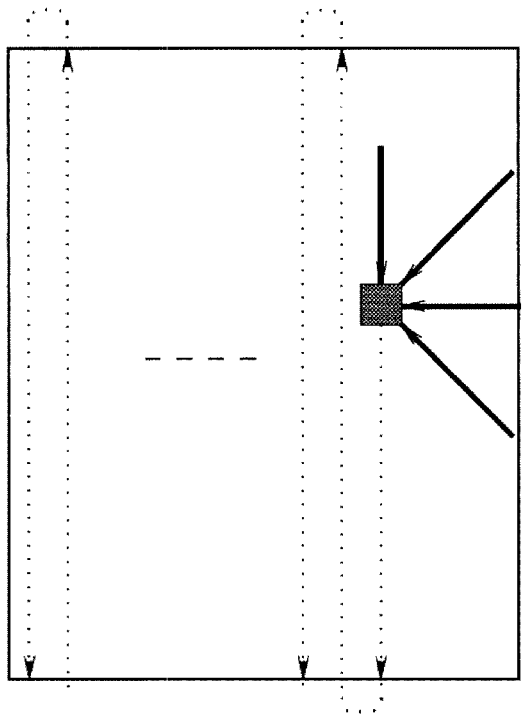
FIGS. 5A and 5B are diagrams illustrating a relationship between a path for calculating a cost in a semi-global matching (SGM) method and a scanning direction.
Figure 5A:
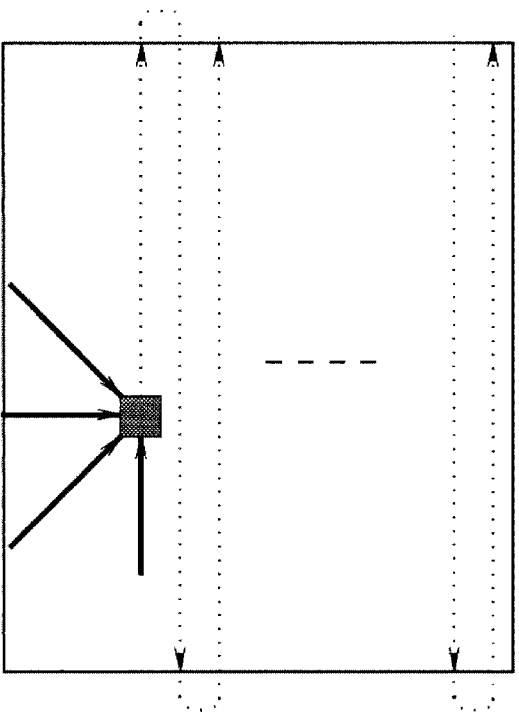

FIGS. 5A and 5B are diagrams illustrating a relationship between a path for calculating a cost in an SGM method and a scanning direction. In FIGS. 5A and 5B, a hatched pixel indicates the current cost value calculation target pixel. In FIGS. 5A and 5B, a thick line with an arrow indicates a path and a direction for calculating a cost. In FIGS. 5A and 5B, a dotted line with an arrow indicates a scanning direction of a pixel in an interpolation image.

Costs in four paths along four directions of being aggregated from a horizontal left direction, a vertical upper direction, an upper right direction of 45 degrees, and an upper left direction of 45 degrees are required to be calculated while referring to results in pixels located in the left and upper directions. Therefore, as illustrated in FIG. 5A, the costs are calculated by performing raster scanning from a pixel located on an upper left part of the interpolation image to a pixel located on a lower right part.

Costs in four paths along four directions of being aggregated from a horizontal right direction, a vertical lower direction, a lower right direction of 45 degrees, and a lower left direction of 45 degrees are required to be calculated while referring to results in pixels located in the right and lower directions. Therefore, as illustrated in FIG. 5B, the costs are calculated by performing raster scanning from a pixel located on a lower right part of the interpolation image to a pixel located on an upper left part.

In other words, when cost computation is performed from eight directions, raster scanning is required to be performed twice by changing a direction thereof. Since the raster scanning is performed twice, first, costs from the four directions calculated during first raster scanning are temporarily stored in a storage device or the like. After second raster scanning is finished, the costs from the four directions stored in the storage device or the like are read and are added to costs from the four direction calculated during the second raster scanning, and thus the combined cost value S is obtained.

Figure 6:
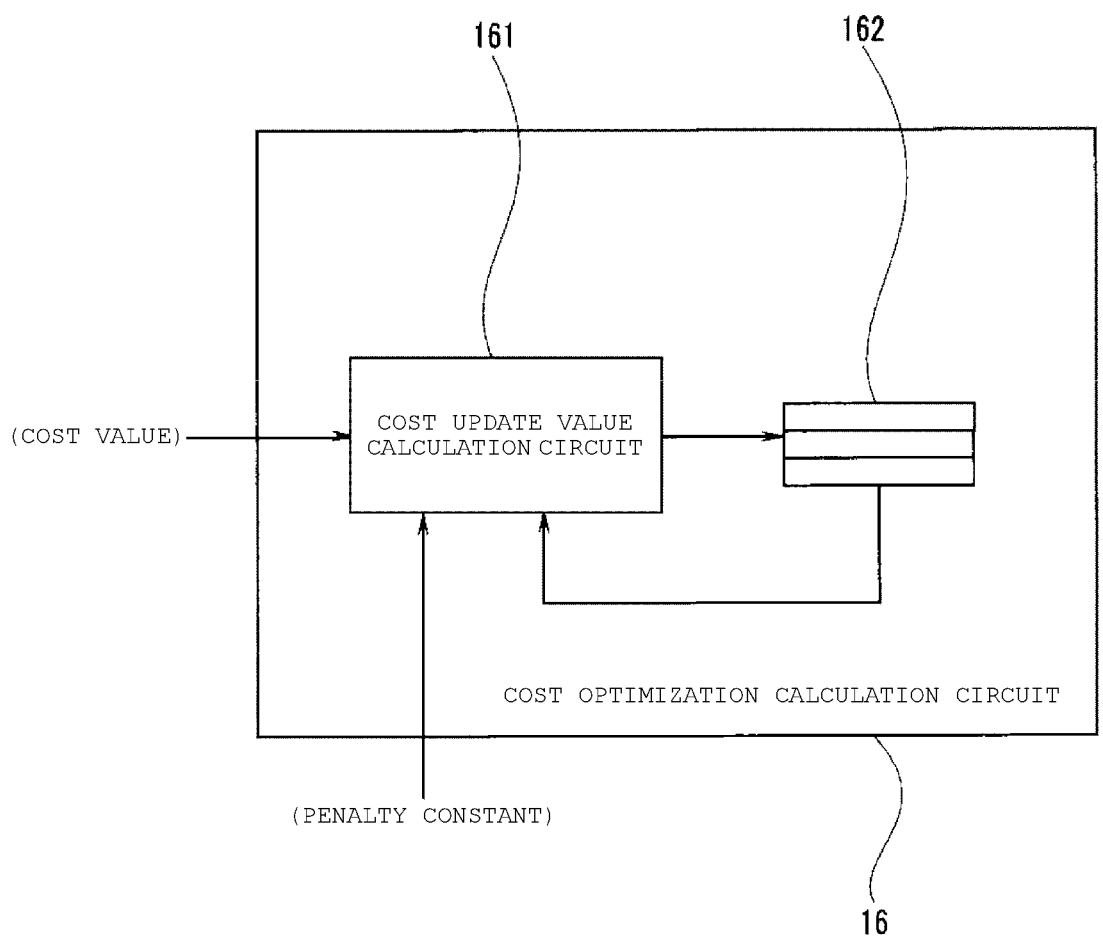
FIG. 6 is a block diagram illustrating a detailed configuration of a cost optimization calculation circuit.

FIG. 6 is a block diagram illustrating a detailed configuration of the cost optimization calculation circuit 16. The cost optimization calculation circuit 16 includes a cost update value calculation portion 161 and a cost buffer 162. The cost update value calculation portion 161 calculates a cost by performing the calculation in the above Equation (1) by using a cost value received from the cost-value calculation circuit 15, the predetermined penalty constants P1 and P2 received from a storage device (not illustrated) or the like, and a cost for an adjacent pixel, stored in the cost buffer 162. A calculation result is stored in the cost buffer 162, and is recursively used for cost calculation in the cost update value calculation portion 161.

The cost optimization calculation circuit 16 is generally used to calculate a cost in a specific single path. Therefore, the cost optimization calculation circuits 16 of the same number as the number of paths which are set to calculate the combined cost value S are provided in the distance information calculation circuit 11.

A method of calculating the combined cost value S in the cost optimization calculation circuit 16 is not limited to the global matching such as a graph cut method, or the SGM method, and other existing methods may be used.

The cost minimum disparity extraction circuit 17 extracts a disparity (that is, a pixel position in the interpolation image) causing the combined cost value S calculated in the cost optimization calculation circuit 16 to be the minimum. Disparities are extracted for all pixels of the standard image.

The crosscheck buffer 18 stores a disparity extracted by the cost minimum disparity extraction circuit 17 for each pixel in an image which is previously set as a standard image when crosscheck is performed by replacing left and right images with each other as a standard image.

The disparity output circuit 19 outputs the disparity extracted for each pixel in the image which is previously set as a standard image, to the intensive disparity range determination circuit 23 as a disparity standard. A difference between the disparity for each pixel stored in the crosscheck buffer 18 and a disparity for each pixel in an image which is set as a standard image later is checked, and thus the validity of whether or not a disparity is correctly obtained for each pixel is checked.

The disparity which is input to the disparity output circuit 19 is a disparity based on a pixel position in the interpolation image. Therefore, the disparity is required to be converted into a disparity in the standard image. A correspondence relationship between a pixel position in a reference image and a pixel position in an interpolation image is stored in the disparity interval information memory 24 which will be described later. A resolution of the reference image is the same as a resolution of the standard image. Therefore, the disparity for each pixel in an image which is set as the standard image later is converted into a disparity in the reference image by using information stored in the disparity interval information memory 24, and thus the disparity which is input to the disparity output circuit 19 is converted into a disparity in the standard image.

When a correspondence relationship between a pixel position in a reference image and a pixel position in an interpolation image is not stored in the disparity interval information memory 24, an input disparity for each pixel is used as a disparity in the standard image. Crosscheck of a disparity described below is performed by using a disparity obtained through conversion.

Figure 7:
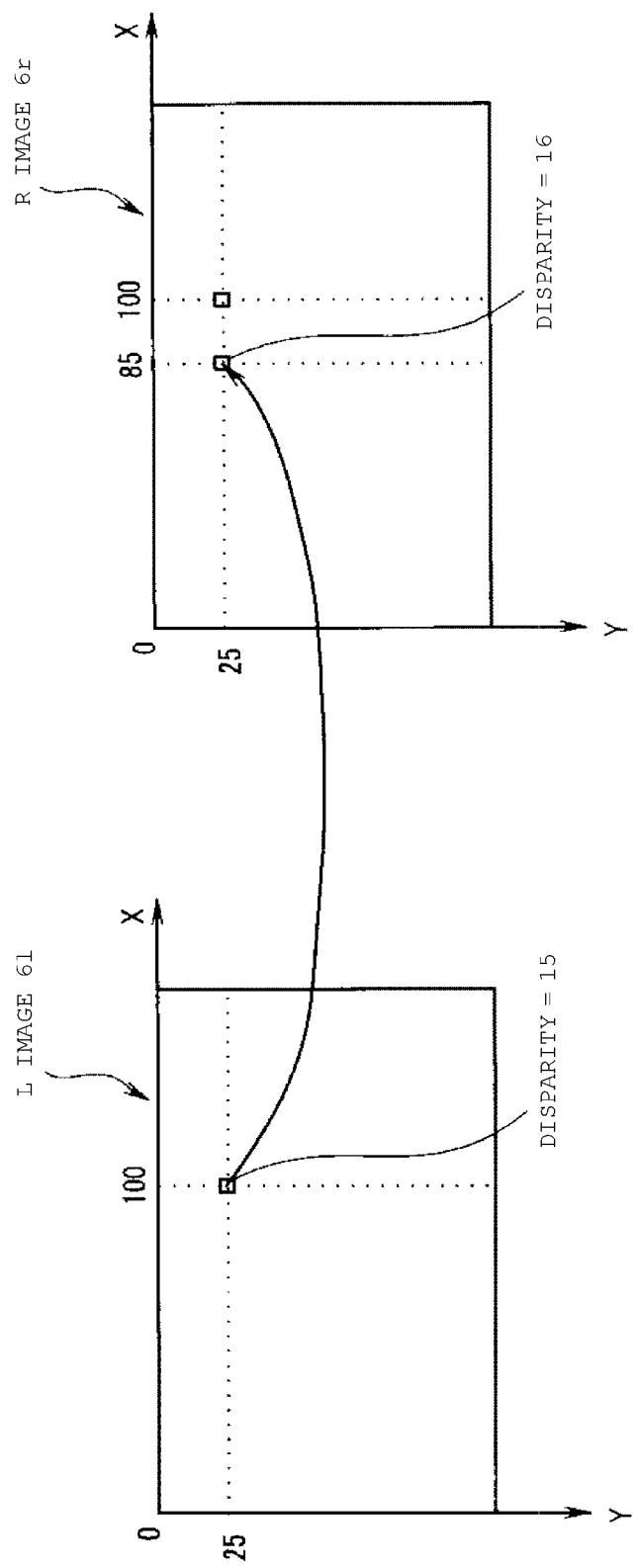
FIG. 7 is a diagram illustrating a method of crosschecking a disparity in a disparity output circuit.

FIG. 7 is a diagram illustrating a method of crosschecking a disparity in the disparity output circuit 19. Specifically, for each pixel of an L image, a calculated disparity (that is, a disparity obtained through conversion) is subtracted from an X coordinate of the pixel, and thus a corresponding pixel position of an R image is obtained. For example, when a disparity obtained through conversion for a pixel (X,Y)= (100,25) of an L image is calculated as 15, a corresponding pixel (X,Y)=(85,25) of an R image is obtained by subtracting 15 from 100. Next, the calculated disparity at the pixel position of the R image is read from the crosscheck buffer 18, and a difference from the disparity for the pixel of the previous L image is calculated. For example, when the disparity obtained through conversion for the pixel (X,Y)=

(85,25) of the R image is 16, a difference is 15−16=−1. An absolute value of the calculated difference is compared with a preset threshold value, and, when the absolute value is smaller than the threshold value, it is determined that a disparity is correctly obtained.

Regarding a crosscheck method in the disparity output circuit 19, it may be determined whether or not a disparity is correctly obtained by comparing a disparity when an L image is used as a standard image with a disparity when an R image is used as a standard image, and a crosscheck method is not limited to the above-described method. For example, a method or formula of subtracting a disparity from each coordinate or a correctness determination through comparison with a threshold value may be replaced with other methods.

The disparity output circuit 19 outputs the disparity and the check result. The disparity and the check result may be separately output, and the check result included in the disparity may be output by replacing the calculated disparity with a specific value (for example, −1) with respect to a pixel for which a disparity is not correctly obtained. When crosscheck is not performed, a disparity extracted by the cost minimum disparity extraction circuit 17 is converted into a disparity in a standard image and output by the disparity output circuit 19.

The disparity output circuit 19 performs control of an output order or computation of addresses such that disparities are output in a raster scanning order from a pixel located on an upper left part of an image toward a pixel on a lower right part.

The intensive disparity range determination circuit 23 determines a range in which a disparity is intensively retrieved in a reference image with respect to a standard image after left and right images are replaced with each other, on the basis of the disparity standard received from the disparity output circuit 19, that is, the disparity extracted for each pixel in the image which is previously set as the standard image.

The range in which a disparity is intensively retrieved may be determined in the one pixel unit. The standard image may be divided into predetermined small regions, and the range may be determined for each small region. When the range is determined in the one pixel unit, a disparity retrieval range is determined such that intensive retrieval is performed as a pixel comes closer to the disparity standard extracted for the pixel. For example, when the previous standard image is an R image, and a disparity standard for the pixel (X,Y)=(85,25) is 1, in order to retrieve a disparity for a pixel (X,Y)=(86,25) with respect to an L image after left and right images are replaced with each other, the pixel (X,Y)=(85,25) of a reference image (that is, the R image) is set as a disparity intensive retrieval pixel position, and a disparity retrieval range is determined such that intensive retrieval is performed with respect to pixels in the vicinity of the disparity intensive retrieval pixel position.

When determining a range in which a disparity is intensively retrieved for each small region, first, distribution statistics of disparity standards are acquired for each small region. A pixel position separated from a disparity computation target pixel by an average value of disparity standards is set as a disparity intensive retrieval pixel position in a corresponding small region of a standard image after left and right images are replaced with each other. For example, it is assumed that a previous standard image is an R image, the image is divided into small regions of sixteen blocks by dividing the image into four blocks in the horizontal direction and four blocks in the vertical direction, and an average value of disparity standards for pixels included in a small region at an upper right end is 40. In this case, first, an L image which is a standard image after left and right images are replaced with each other is also divided into small regions of sixteen blocks by dividing the image into four blocks in the horizontal direction and four blocks in the vertical direction. When a disparity computation target pixel is included in the small region at the upper right end, a pixel which is located toward the right side by 40 pixels from the disparity computation target pixel position in the R image as a reference image is set as a disparity intensive retrieval pixel position, and a disparity retrieval range is determined such that intensive retrieval is performed with respect to the vicinity thereof.

A disparity intensive retrieval pixel position is not limited to an average value of distribution statistics, and may employ a peak value, a maximum likelihood estimate, or a median. When a variation between disparity standards of pixels included in a small region is considerable, for example, a variance exceeds a predetermined value, a region in which a disparity is intensively retrieved may not be provided in the small region, and uniform retrieval may be performed in the same manner as in normal disparity retrieval.

A small region division method is not limited to a method of equally dividing an image into small regions in the vertical direction and horizontal direction, and other methods may be used, for example, object recognition may be performed on a standard image, and division may be performed by using a recognition result. A division method or a division number may be changed depending on cases.

FIGS. 8A to 8D are diagrams illustrating a method of determining a cost value calculation target pixel in the intensive disparity range determination circuit 23. FIGS. 8A to 8D illustrate a method of determining a cost value calculation target pixel when a position of a disparity computation target pixel in a later standard image (that is, the L image) is (X,Y)=(150,25), and the maximum disparity in the horizontal direction is 128 pixels, as a specific example. It is assumed that, in the previous standard image (that is, the R image), an average of disparity standards of a small region including the pixel (X,Y)=(150,25) is 1.

Pixel columns illustrated in FIGS. 8A to 8D are results of extracting parts of pixels in the Y=25-th row. Pixel columns illustrated in FIG. 8A indicate pixel columns included in a cost value calculation pixel region in a reference image. In other words, FIG. 8A illustrates pixels in the range of (X,Y)=(150,25) to (23,25) in the reference image. Pixel columns illustrated in FIGS. 8B and 8C are pixel columns which are expanded to twice the resolution of the pixels in FIG. 8A. Pixel columns illustrated in FIG. 8D indicate pixel columns included in a cost value calculation pixel region in an interpolation image.

A number written over each pixel indicates a coordinate position of the pixel in the horizontal direction. A number in the parenthesis indicates a coordinate position in the X direction in the reference image. For example, (23) indicates that a coordinate position in the X direction in the reference image is 23. A number outside the parenthesis indicates a coordinate position in the X direction in an image expanded twice in resolution. For example, 27 indicates that a coordinate position in the twice expanded image is 27. An underlined number indicates a coordinate position in the X direction in an interpolation image. For example, 24 indicates that a coordinate position in the X direction in an interpolation image is 24.

Hereinafter, a description will be made of determining a cost value calculation target pixel. First, the intensive disparity range determination circuit 23 sets a disparity computation target pixel, and extracts a cost value calculation pixel region. In the example illustrated in FIGS. 8A to 8D, the cost value calculation pixel region includes pixels in the range of (X,Y)=(150,25) to (23,25) (refer to the pixel columns in FIG. 8A). A disparity intensive retrieval pixel position for the pixel is calculated. In FIGS. 8A to 8D, the disparity computation target pixel is (X,Y)=(150,25), and an average of disparity standards of the small including the pixel is 1. Thus, the disparity intensive retrieval pixel position in the X direction is X=150−1=149.

Next, the pixel included in the cost value calculation pixel region is doubled, and thus a resolution is increased. In other words, 128 pixels in the range of (X,Y)=(150,25) to (23,25) are expanded, and thus 255 pixels are generated (refer to the pixel columns in FIG. 8B).

Next, a cost value calculation target pixel is extracted from the 255 pixels of which the resolution is increased. The number of extracted cost value calculation target pixels is the same as the number of the maximum disparity (in this case, 128 pixels are extracted).

In this case, pixels near the disparity intensive retrieval pixel position are extracted at a fine interval, and pixels far from the disparity intensive retrieval pixel position are extracted at a rough interval. The term "interval" indicates an interval of pixels which are extracted as cost value calculation target pixels from pixels of which a resolution is increased. The phrase "extracted at a fine interval" indicates that an interval of extracted pixels is set to be narrow, and cost value calculation target pixels are consecutively extracted. The phrase "extracted at a rough interval" indicates that an interval of extracted pixels is set to be wide, and cost value calculation target pixels are discretely extracted.

The pixel columns illustrated in FIG. 8C indicate examples of cost value calculation target pixels extracted in the above-described way. In FIGS. 8A to 8D, the cost value calculation target pixels are hatched. In other words, pixels are extracted at a fine interval in the vicinity of the pixel assigned with (149) which is a disparity intensive retrieval pixel position (that is, a pixel of X=275 in the twice expanded image). In other words, the hatched pixels are consecutively located, and all of the pixels are selected as cost value calculation target pixels. Pixels are extracted at a slightly rough interval at a position slightly separated from the disparity intensive retrieval pixel position. In other words, the hatched pixels are disposed every other pixel. On the other hand, pixels are extracted at a rougher interval at a position far from the disparity intensive retrieval pixel position. In other words, one of four pixels is the hatched pixel, and thus the hatched pixels are discretely disposed.

As mentioned above, pixels in the vicinity of the disparity standard are finely extracted, and thus it is possible to improve the accuracy of calculation of a disparity. Pixels far from the disparity standard are discretely extracted, and thus it is possible to prevent an increase in a disparity computation amount.

The intensive disparity range determination circuit 23 inputs the cost value calculation target pixel positions extracted as described above, to the input image interpolation circuit 21. The extracted cost value calculation target pixel positions are stored in the disparity interval information memory 24. The input image interpolation circuit 21 deletes pixels disposed at positions other than the positions of the input cost value calculation target pixels from the doubled pixels, and fills the empties with the remaining pixels from the right side and thus disposes the pixels. Consequently, as indicated by the pixel columns in FIG. 8D, the cost value calculation target pixels can be disposed at the positions of (X,Y)=(150,25) to (23,25) of the interpolation image. For example, the pixel (X,Y)=(23,25) of the reference image is disposed at the pixel (X,Y)=(23,25) of the interpolation image. The pixel (X,Y)=(25,25) of the reference image is disposed at the pixel (X,Y)=(24,25) of the interpolation image. A pixel generated by interpolating the reference image and corresponding to the pixel (X,Y)=(147.5,25) of the reference image is disposed at the pixel (X,Y)=(145,25) of the interpolation image.

Data which is input to the input image interpolation circuit 21 or is stored in the disparity interval information memory 24 from the intensive disparity range determination circuit 23 is not limited to a cost value calculation target pixel position, and data may be input, such as a relative position for a disparity computation target pixel (for example, an index) or an extraction rule for a cost value calculation target pixel, with which the input image interpolation circuit 21 can calculate a cost value calculation target pixel position.

When the combined cost value S is calculated while referring to a retrieval result (that is, a cost value) among pixels in the cost optimization calculation circuit 16, and when the retrieval result among the pixels to be referred to is not calculated, the cost value interpolation circuit 22 interpolates a cost value for a pixel by using a retrieval result among peripheral pixels. For example, when a first small region in which a cost value calculation target pixel is extracted by setting an interval to be fine in a region in which a disparity is small and setting an interval to be rough in a region in which a disparity is large, and a second small region in which a cost value calculation target pixel is extracted uniformly in a cost value calculation target pixel region, are disposed to be adjacent to each other, it is necessary for the cost value interpolation circuit 22 to interpolate a cost value.

Figure 9A:
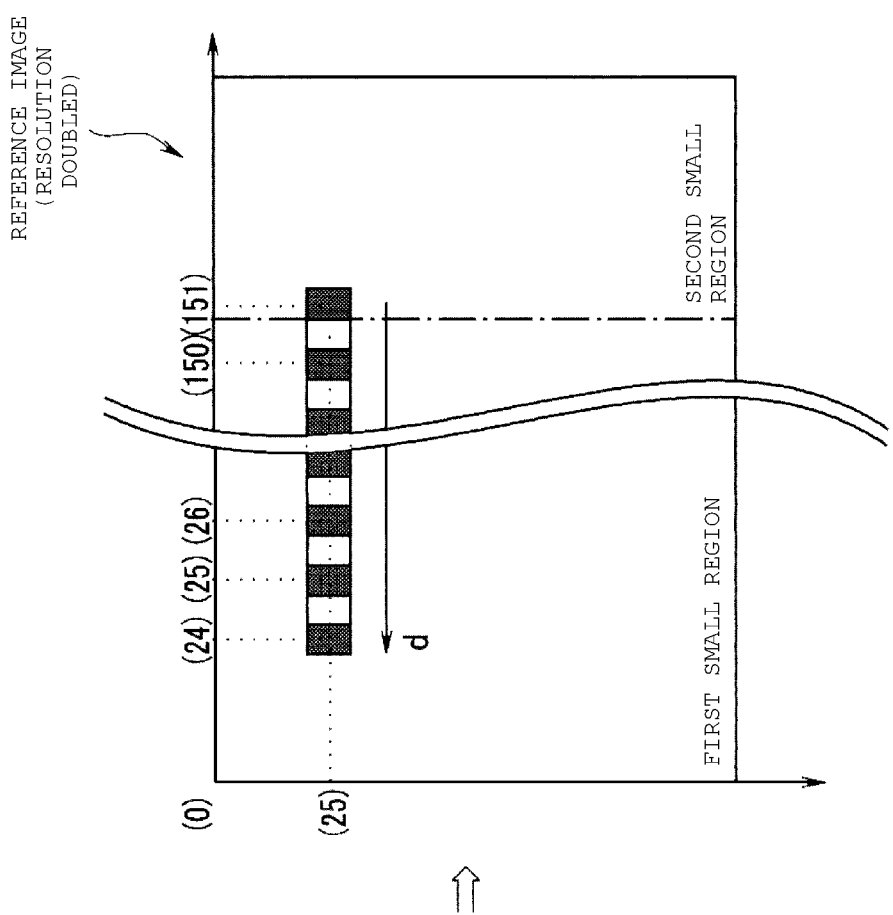
FIGS. 9A and 9B are diagrams illustrating an example of a pixel requiring cost value interpolation in a cost value interpolation circuit.
Figure 9B:
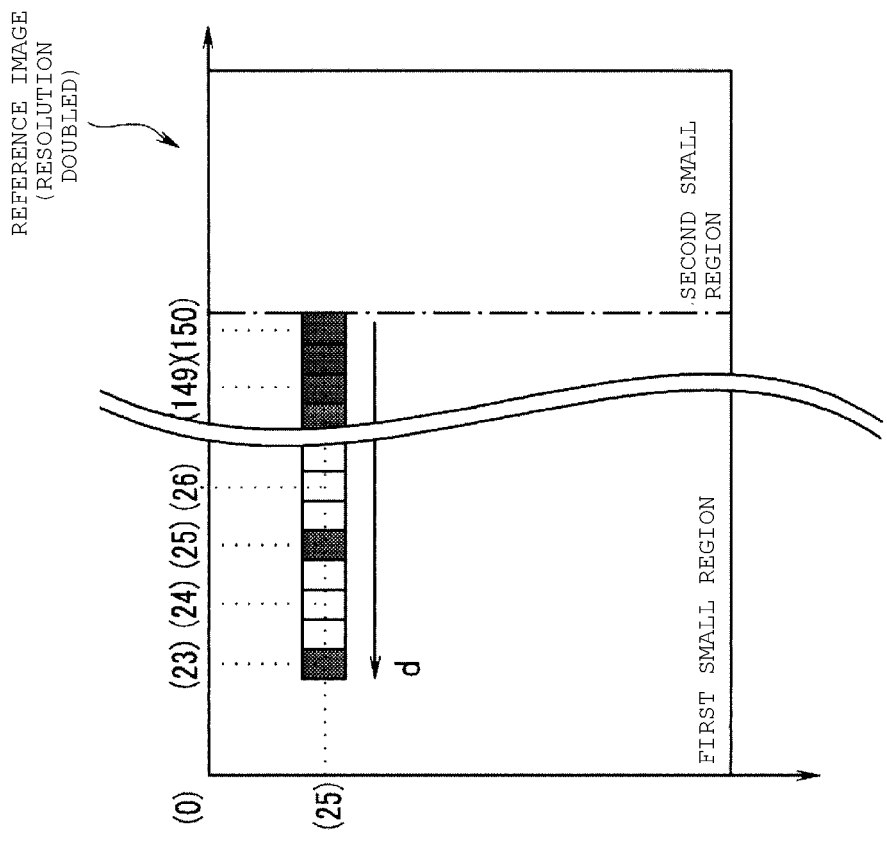

Hereinafter, a description thereof will be made by using a specific example. FIGS. 9A and 9B are diagrams illustrating an example a pixel requiring cost value interpolation in the cost value interpolation circuit 22. FIG. 9A illustrates an example of a cost value calculation target pixel at the cost value calculation target pixel (X,Y)=(150,25), and FIG. 9B illustrates an example of a cost value calculation target pixel at the cost value calculation target pixel (X,Y)=(151,25). FIGS. 9A and 9B illustrate a reference image expanded twice in resolution in the horizontal direction, and pixels extracted as cost value calculation target pixels are hatched.

A coordinate in the parenthesis in FIGS. 9A and 9B indicates a coordinate in the reference image before being expanded. In FIGS. 9A and 9B, it is assumed that the maximum disparity in the horizontal direction in a standard image (for example, an L image) is 128 pixels, a region in which X coordinates are 0 to 150 is referred to as a first small region, and a region in which X coordinates are 151 or more is referred to as a second small region. In other words, it is assumed that the pixel (X,Y)=(150,25) is included in the first small region, and the adjacent pixel (X,Y)=(151,25) is included in the second small region. A coordinate axis d illustrated in FIGS. 9A and 9B indicates a disparity direction with a disparity computation target pixel as a reference.

As illustrated in FIG. 9A, when a disparity computation target pixel is (X,Y)=(150,25), pixels are extracted at a fine interval in a region in which a disparity is small. For example, pixels extracted in the region in which a disparity is small are (X,Y)= . . . , (149,25), (149.5,25), and (150,25).

On the other hand, pixels are extracted at a rough interval in a region in which a disparity is large. For example, pixels extracted in the region in which a disparity is large are (X,Y)= . . . , (23,25), (25,25), and (27,25). Next, as illustrated in FIG. 9B, when a disparity computation target pixel is shifted by one pixel in the horizontal direction so as to be set to (X,Y)=(151,25), and a cost value is calculated, pixels are extracted at a uniform interval in all regions. In other words, extracted pixels are (X,Y)=(24,25), (25,25), (26,25), . . . , (150,25), and (151,25).

In other words, cost values for the pixels (X,Y)=(24,25) and (26,25) required to calculate the combined cost value S for the disparity computation target pixel (X,Y)=(151,25) are not necessary in calculation of the combined cost value S for the disparity computation target pixel (X,Y)=(150,25), and thus are not calculated. Therefore, when the combined cost value S for disparity computation target pixel (X,Y)= (151,25) is calculated, cost values for the pixels (X,Y)=(24, 25) and (26,25) are generated through interpolation by using cost values or the like for peripheral pixels. An interpolation method such as a bilinear method or a bi-cubic method is used to interpolate a cost value.

The control circuit 20 gives instructions for setting of a standard image and a pixel scanning direction in each image to each of the input image acquisition circuit 14, the input image interpolation circuit 21, the cost-value calculation circuit 15, the cost optimization calculation circuit 16, and the cost minimum disparity extraction circuit 17.

Figure 10:
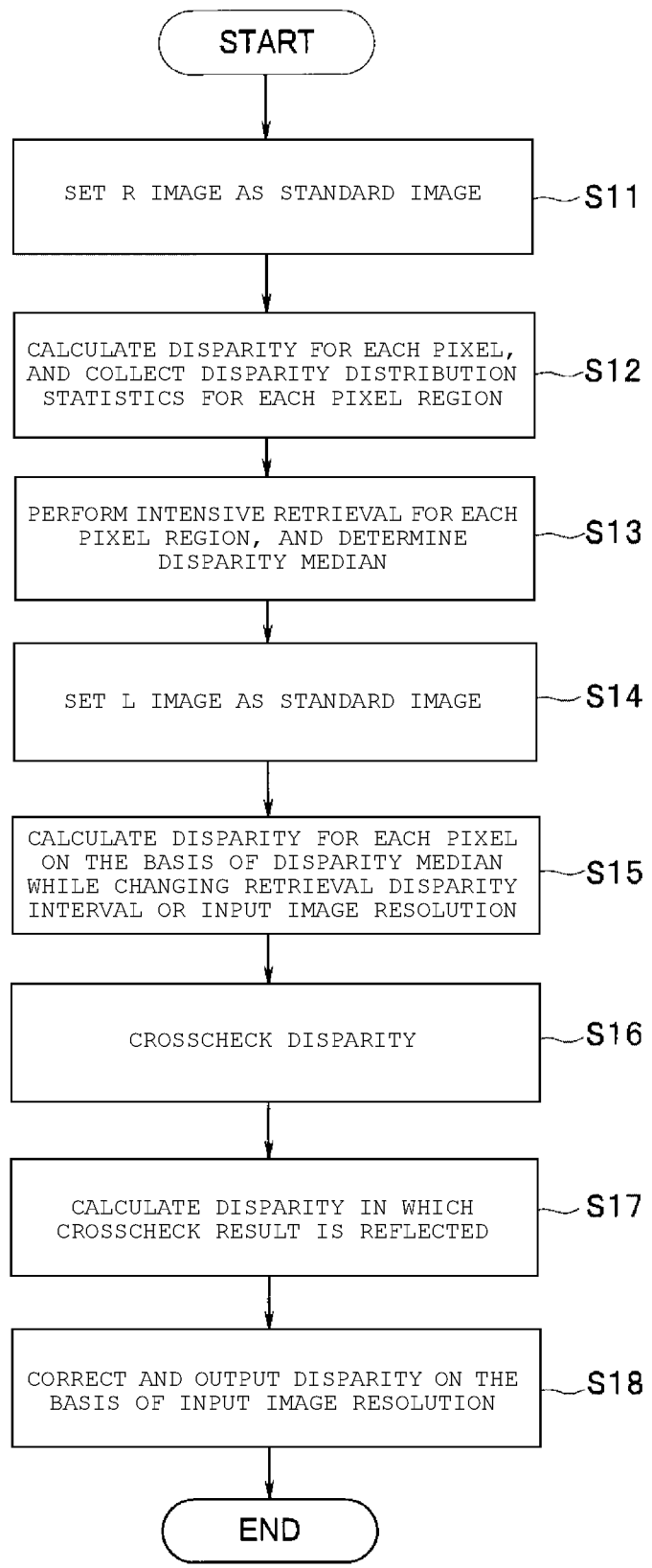
FIG. 10 is a flowchart illustrating an image processing procedure according to a first embodiment.

Next, a description will be made of a disparity calculation procedure in the image processing apparatus of the present embodiment. FIG. 10 is a flowchart illustrating an image processing procedure according to the present embodiment. FIG. 10 illustrates a procedure when crosscheck is performed once on the basis of a disparity calculated by using an R image as a standard image when a disparity is output by using an L image as a standard image.

First, the control circuit 20 sets, as a standard image, an R image in each of the input image acquisition circuit 14, the input image interpolation circuit 21, the cost-value calculation circuit 15, the cost optimization calculation circuit 16, and the cost minimum disparity extraction circuit 17 (S11). Typically, first, a disparity is calculated by using an image reverse to an image of which a disparity is output, as a standard image. Therefore, in the above-described case, a disparity is calculated by using an R image as a standard image first. When a disparity is desired to be output by using an R image as a standard image, an L image is set as a standard image in S11.

Next, each of the input image acquisition circuit 14, the cost-value calculation circuit 15, the cost optimization calculation circuit 16, and the cost minimum disparity extraction circuit 17 calculates a disparity for each pixel while scanning an interpolation image of the L image which is a reference image by using the R image as a standard image, and acquires distribution statistics of disparities for each predetermined small region (S12). S12 is executed as follows, specifically.

First, each of the input image acquisition circuit 14, the cost-value calculation circuit 15, the cost optimization calculation circuit 16, and the cost minimum disparity extraction circuit 17 calculates a disparity for each pixel while scanning an interpolation image of the L image which is a reference image by using the R image as a standard image. In this case, the input image interpolation circuit 21 outputs the reference image which is an input image as an interpolation image without performing an image expansion process. In other words, the interpolation image is the L image.

Disparities causing the combined cost value S to be the minimum are extracted for all pixels of the standard image, so as to be stored in the crosscheck buffer 18 and be also output to the disparity output circuit 19. The disparity output circuit 19 outputs the disparities for all of the pixels of the standard image to the intensive disparity range determination circuit 23 as disparity standards. The intensive disparity range determination circuit 23 divides the standard image into small regions on the basis of a predetermined logic. Distribution statistics of the disparity standards for pixels included in a region are acquired for each small region.

Next, the intensive disparity range determination circuit 23 determines a disparity intensive retrieval pixel position at which intensive retrieval is performed (for example, a disparity median), for each small region, on the basis of the distribution statistics of the disparity standards acquired in S12 (S13).

The control circuit 20 replaces a standard image, and sets, as a standard image, the L image in each of the input image acquisition circuit 14, the input image interpolation circuit 21, the cost-value calculation circuit 15, the cost optimization calculation circuit 16, and the cost minimum disparity extraction circuit 17 (S14).

Next, each of the input image acquisition circuit 14, the input image interpolation circuit 21, the cost-value calculation circuit 15, the cost optimization calculation circuit 16, and the cost minimum disparity extraction circuit 17 calculates a disparity for each pixel while scanning an interpolation image of the R image which is a reference image by using the L image as a standard image (S15). S15 is executed as follows, specifically.

First, the input image interpolation circuit 21 generates an interpolation image of the reference image (that is, the R image) received from the input image acquisition circuit 14 in response to an instruction from the intensive disparity range determination circuit 23. Since a disparity intensive retrieval pixel position differs depending on a disparity computation target pixel, an instruction corresponding to a disparity computation target pixel is received from the intensive disparity range determination circuit 23, and an interpolation image is generated, whenever the disparity computation target pixel is set to the next pixel.

Next, the cost-value calculation circuit 15 sets a cost value calculation pixel region for a disparity computation target pixel in the interpolation image, and calculates a cost value in the region. Next, the cost optimization calculation circuit 16 calculates the combined cost value S, and the cost minimum disparity extraction circuit 17 extracts a disparity causing the combined cost value S to be the minimum.

Next, the disparity output circuit 19 checks a difference between the disparity for each pixel, stored in the crosscheck buffer 18, obtained by using the R image as a standard image and the disparity for each pixel obtained by using the L image as a standard image, and checks whether or not a disparity is correctly obtained for each pixel (S16).

Next, the disparity output circuit 19 reflects a check result in the disparity for each pixel obtained by using the L image as a standard image, and replaces the calculated disparity with a specific value (for example, −1) with respect to a pixel for which the disparity is not correctly obtained (S17). The calculated disparity is used without being changed with respect to a pixel for which the disparity is correctly obtained. The disparity and the check result may be separately output without replacement of the disparity corresponding to the check result.

Finally, the calculated disparity is corrected by using data (for example, data regarding a correspondence relationship between a pixel position in a correction image and a pixel position in the reference image) stored in the disparity interval information memory 24 in S15, and is converted into a disparity in the standard image so as to be output (S18), and the disparity calculation process is finished.

As mentioned above, according to the present embodiment, when a disparity is calculated by replacing left and right images with each other as a standard image, and crosscheck is performed, a range in which a disparity is intensively retrieved on the basis of a disparity calculated by using a previous standard image (that is, a disparity standard) when a disparity is calculated in a later reference image. Therefore, it is possible to acquire a disparity standard without adding a processing circuit or calculation. When a disparity is calculated in a later standard image, pixels near a disparity standard are finely extracted, and pixels far from the disparity standard are discretely extracted, so that cost calculation is performed, and thus it is possible to improve the accuracy of calculation of a disparity while preventing an increase in a computation amount.

The image processing apparatus 1 of the present embodiment may be used as a driving assistance system in a movable object 100 or the like. Next, a description will be made of the movable object 100 mounted with the image processing apparatus 1 of the present embodiment.

Figure 11:
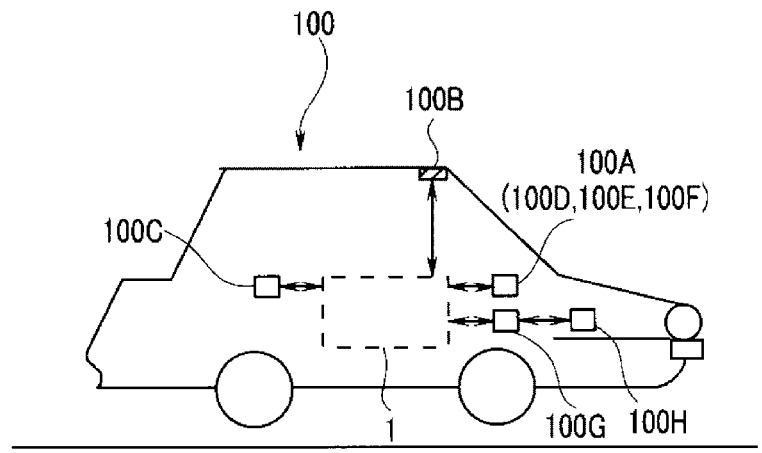
FIG. 11 is a diagram illustrating a movable object according to the first embodiment.

FIG. 11 is a diagram illustrating an example of the movable object 100 of the present embodiment.

The movable object 100 includes the image processing apparatus 1, an output unit 100A, a sensor 100B, an input device 100C, a power control unit 100G, and a power unit 100H.

The movable object 100 is, for example, a vehicle (for example, a motorcycle, a four-wheeled vehicle, or a bicycle), a cart, a robot, a ship, and a flying object (for example, an airplane or an unmanned aerial vehicle (UAV)). The movable object 100 is, for example, a movable object which travels through a driving operation performed by a person, or a movable object which can automatically travel (that is, autonomously travel) without requiring a driving operation performed by a person. A movable object which can automatically travel is, for example, an automatic driving vehicle. The movable object 100 of the present embodiment will be described by exemplifying a case of a motor vehicle which can autonomously travel.

The image processing apparatus 1 as a driving assistance system is not limited to a form of being mounted on the movable object 100. The image processing apparatus 1 may be mounted on a stationary object. The stationary object is an object which is not movable, or is an object which is stationary with respect to the ground. The stationary object is, for example, a guardrail, a pole, a parked vehicle, or a road sign. The image processing apparatus 1 may be mounted on a cloud server which performs a process on a cloud.

The output unit 100A outputs various pieces of information. For example, the output unit 100A outputs output information based on various processes.

The output unit 100A has, for example, a communication function of transmitting output information, a display function of displaying the output information, and a sound output function of outputting sounds indicating the output information. For example, the output unit 100A includes a communication portion 100D, a display 100E, and a speaker 100F.

The communication portion 100D performs communication with an external apparatus. The communication portion 100D is a VICS (registered trademark) communication circuit or a dynamic map communication circuit. The communication portion 100D transmits the output information to the external apparatus. The communication portion 100D receives road information or the like from the external apparatus. The road information includes signals, signs, surrounding buildings, a width of each lane, and a lane central line. The road information may be stored in a memory 1b such as a RAM or a ROM provided in the image processing apparatus, and may be stored a memory which is separately provided in the movable object.

The display 100E displays the output information. The display 100E is, for example, a well-known liquid crystal display (LCD), projection device, or light. The speaker 100F outputs sounds indicating the output information.

The sensor 100B is a sensor which acquires a traveling environment of the movable object 100. The traveling environment is, for example, observation information of the movable object 100 or peripheral information of the movable object 100. The sensor 100B is, for example, an external sensor or an internal sensor.

The internal sensor is a sensor for observing observation information. The observation information includes, for example, acceleration of the movable object 100, velocity of the movable object 100, and angular velocity of the movable object 100.

The internal sensor is, for example, an inertial measurement unit (IMU), an acceleration sensor, a velocity sensor, or a rotary encoder. For example, the IMU observes three-axis accelerations and three-axis angular velocities of the movable object 100.

The external sensor observes peripheral information of the movable object 100. The external sensor may be mounted on the movable object 100, and may be mounted on the outside (for example, another movable object or an external apparatus) of the movable object 100.

The peripheral information is information indicating peripheral situations of the movable object 100. The periphery of the movable object 100 is a region within a predefined range from the movable object 100. The range is a range in which the external sensor can perform observation. The range may be set in advance.

The peripheral information includes, for example, captured images and distance information of the periphery of the movable object 100. The peripheral information may include location information of the movable object 100. The captured images are captured image data obtained through imaging (hereinafter, simply referred to as captured images in some cases). The distance information is information indicating a distance from the movable object 100 to a target. The target is an object which can be observed by the external sensor outside the movable object 100. The location information may be a relative location, and may be an absolute location.

The external sensor is, for example, an imaging device which obtains a captured image through imaging, a distance sensor (for example, a millimeter-wave radar, a laser sensor, or a distance image sensor), and a location sensor (for example, a global navigation satellite system (GLASS), a global positioning system (GPS), or a radio communication device).

The captured image is digital image data in which a pixel value is defined for each pixel, or a depth map in which a distance from the sensor 100B is defined for each pixel. The laser sensor is, for example, a two-dimensional laser imaging detection and ranging (LIDAR) sensor or a three-dimensional LIDAR sensor which is installed in parallel to a horizontal plane.

The input device 100C receives various instructions or information inputs from a user. The input device 100C is, for example, a pointing device such as a mouse or a trackball, or an input device such as a keyboard. The input device 100C may be an input function in a touch panel integrally provided with the display 100E.

The power control unit 100G controls the power unit 100H. The power unit 100H is a driven device mounted on the movable object 100. The power unit 100H is, for example, an engine, a motor, or wheels.

The power unit 100H is driven under the control of the power control unit 100G. For example, the power control unit 100G determines peripheral situations on the basis of output information generated in the image processing apparatus 1 or information obtained from the sensor 100B, and controls an accelerator operation amount, a brake operation amount, or a steering angle.

Figure 12:
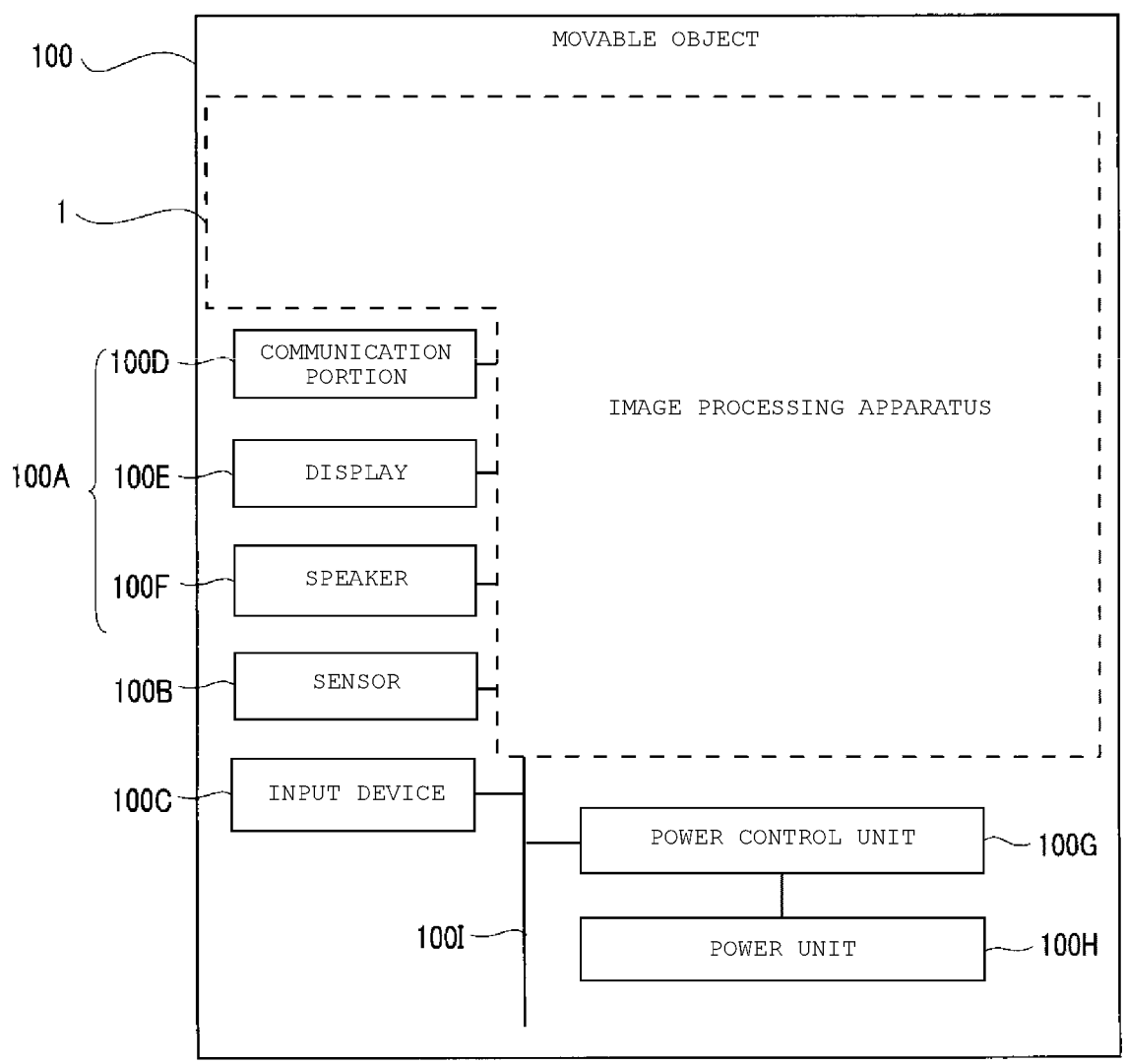
FIG. 12 is a block diagram illustrating a configuration of the movable object.

Next, an electrical configuration of the movable object 100 will be described in detail. FIG. 12 is a block diagram illustrating a configuration of the movable object 100.

The movable object 100 includes the image processing apparatus 1, the output unit 100A, the sensor 100B, the input device 100C, the power control unit 100G, and the power unit 100H. As described above, the output unit 100A includes the communication portion 100D, the display 100E, and the speaker 100F.

The image processing apparatus 1, the output unit 100A, the sensor 100B, the input device 100C, and the power control unit 100G are connected to each other via a bus 1001. The power unit 100H is connected to the power control unit 100G.

Figure 13:
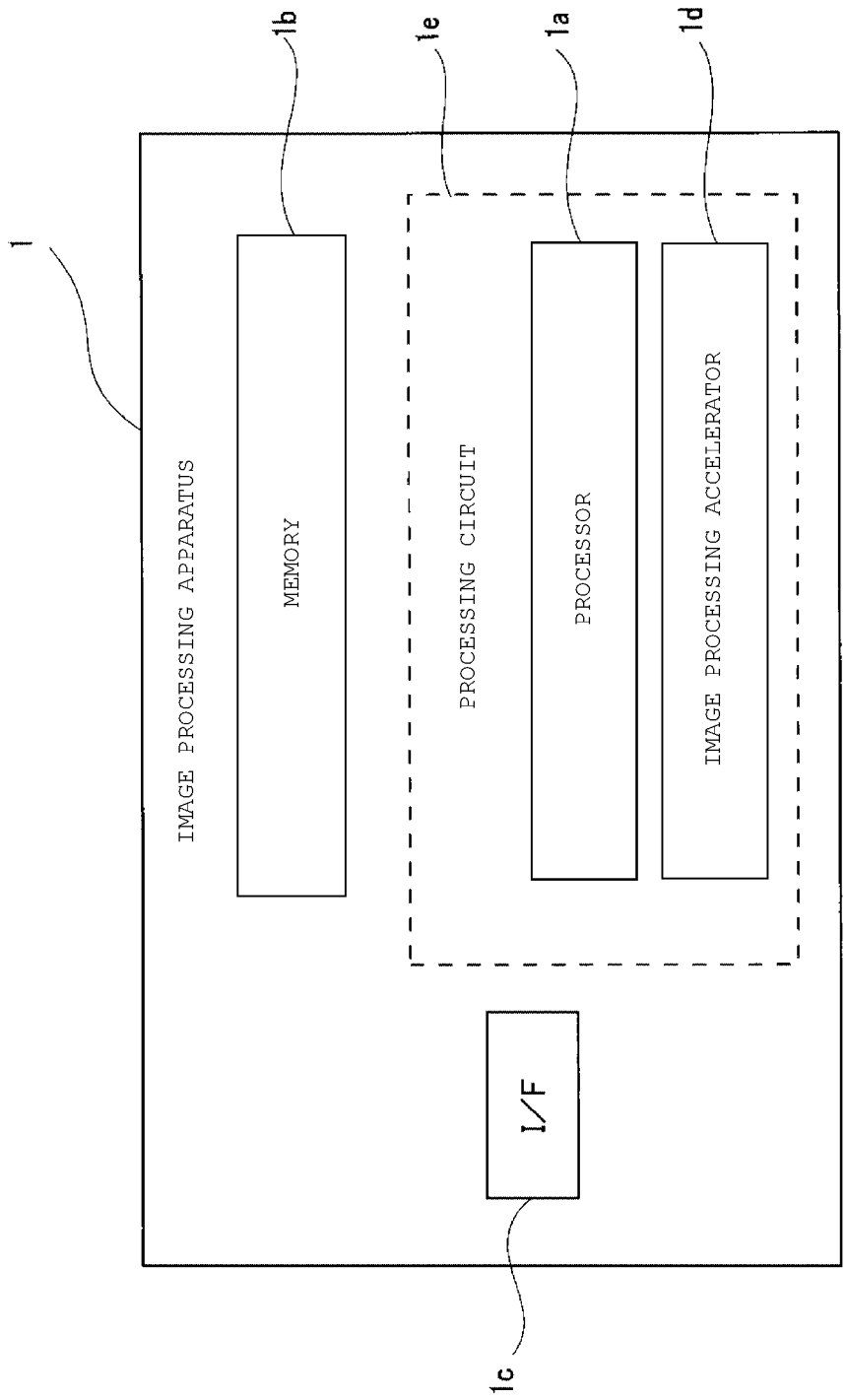
FIG. 13 is a block diagram illustrating an example of an image processing apparatus mounted on the movable object.

FIG. 13 is a block diagram illustrating an example of the image processing apparatus 1 mounted on the movable object 100. The image processing apparatus 1 includes an I/F 1c, the memory 1b, and the processor 1a. In other words, the output unit 100A, the sensor 100B, the input device 100C, the power control unit 100G, and the image processing apparatus 1 are connected to each other via the bus 1001.

At least one of the output unit 100A (that is, the communication portion 100D, the display 100E, and the speaker 100F), the sensor 100B, the input device 100C, and the power control unit 100G may be connected to the image processing apparatus 1 in a wired or wireless manner. At least one of the output unit 100A (that is, the communication portion 100D, the display 100E, and the speaker 100F), the sensor 100B, the input device 100C, and the power control unit 100G may be connected to the image processing apparatus 1 via a network.

The I/F 1c is connected to a network (N/W) or the like with other systems. The I/F 1c transmits and receives information to and from the communication portion 100D. Information regarding a recognized target such as a person or information regarding a distance to a recognized target is output via the I/F 1c.

The memory 1b stores various pieces of data. The memory 1b is, for example, a semiconductor memory element such as a random access memory (RAM) or a flash memory, a hard disk, or an optical disc. The memory 1b may be provided outside the image processing apparatus 1. The ROM holds a program executed by the processor 1a or necessary data. The RAM functions as a work area of the processor 1a. The memory 1b may be provided outside the movable object 100. For example, the memory 1b may be disposed in a server apparatus provided on a cloud.

The memory 1b may be a storage medium. Specifically, the storage medium may download a program or various pieces of information via a local area network (LAN) or the Internet, and may store or temporarily store the program or the information. The memory 1b may be configured with a plurality of storage media.

Each processing function in the processor 1a is stored in the memory 1b in a form of a program executable by a computer. The processor 1a reads the program from the memory 1b, and executes the program, so as to perform a function corresponding to each program.

A processing circuit 1e may be implemented by a combination of a plurality of separate processors for realizing respective functions with each other. In this case, each process executes a program so as to perform the functions of various circuits shown in FIGS. 2 and 3. There may be a case where each processing function is configured as a single program, and a single processing circuit 1e executes each program, and there may be a case where an image processing accelerator 1d is provided as a dedicated circuit, and a specific function is installed in an independent program execution circuit.

The processor 1a reads and executes the program stored in the memory 1b, so as to perform a function. The program may be directly incorporated into a circuit of the processor instead of storing the program in the memory 1b. In this case, the processor reads and executes the program incorporated into the circuit, so as to perform the function.

In the movable object 100 configured as mentioned above, when a disparity is calculated by using a captured image which is peripheral information observed by the sensor 100B, it is also possible to improve the accuracy of calculation of a disparity while preventing an increase in a computation amount, by using the above-described image processing method.

Second Embodiment

In the first embodiment, when a disparity is crosschecked, a range in which a disparity is intensively retrieved in a later standard image is determined on the basis of a disparity calculated by using a previous standard image (disparity standard). In contrast, in the present embodiment, when the combined cost value S is obtained by scanning an image a plurality of times in order to calculate a disparity with the SGM method, a range in which a disparity is intensively retrieved in later scanning is determined on the basis of a disparity calculated in previous scanning (disparity standard). A configuration of an image processing apparatus in the present embodiment is the same as that of the image processing apparatus of the first embodiment illustrated in FIG. 2, and thus a description thereof will be omitted.

Figure 14:
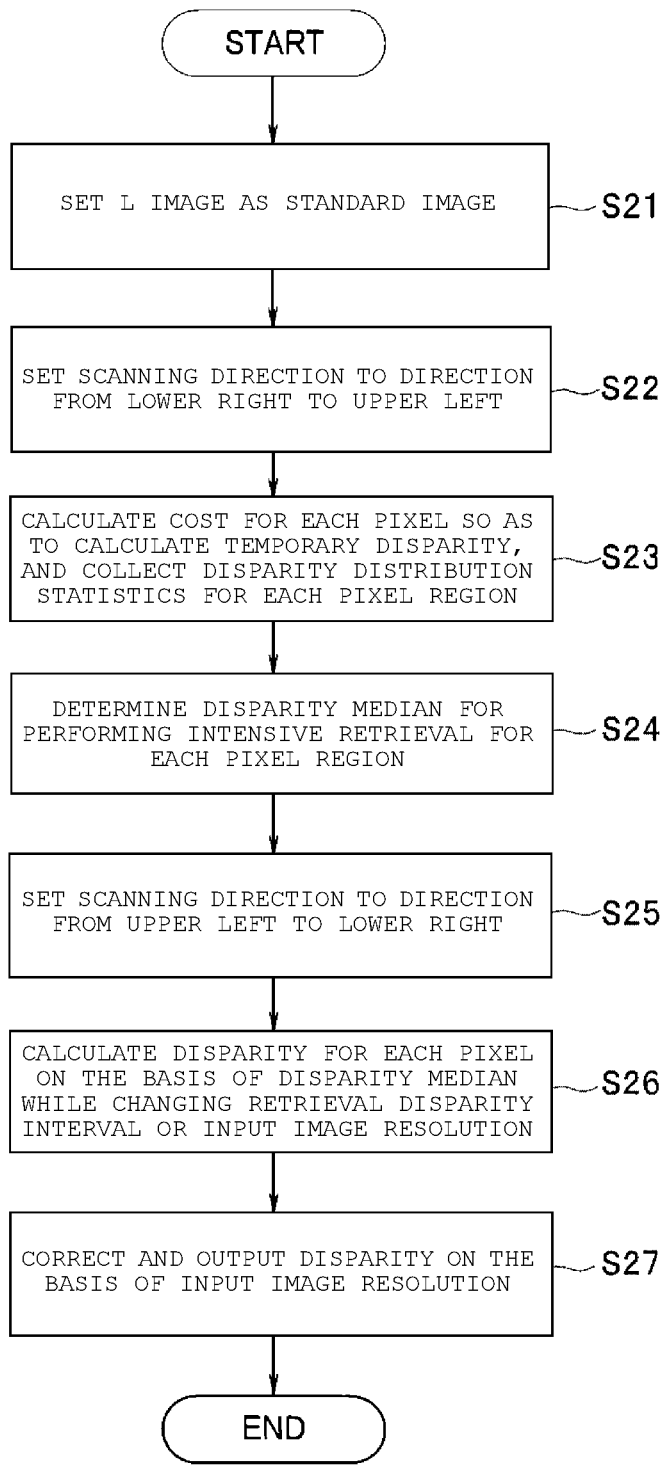
FIG. 14 is a flowchart illustrating an image process order according to a second embodiment.

FIG. 14 is a flowchart illustrating an image processing procedure according to the second embodiment. FIG. 14 illustrates a procedure in which a disparity is output while scanning an image twice according to the SGM method.

First, the control circuit 20 sets, as a standard image, an L image in each of the input image acquisition circuit 14, the input image interpolation circuit 21, the cost-value calculation circuit 15, the cost optimization calculation circuit 16, and the cost minimum disparity extraction circuit 17 (S21). When a disparity is desired to be output by using an R image as a standard image, the R image is set as a standard image in S21.

The control circuit 20 sets a scanning direction in each of the input image acquisition circuit 14, the input image interpolation circuit 21, the cost-value calculation circuit 15, the cost optimization calculation circuit 16, and the cost minimum disparity extraction circuit 17 such that pixels are scanned in a direction from a lower right part to an upper left part (S22).

Next, each of the input image acquisition circuit 14, the input image interpolation circuit 21, the each-disparity-cost-value calculation circuit 15, the cost optimization calculation circuit 16, and the cost minimum disparity extraction circuit 17 calculates a disparity while scanning an interpolation image of the R image which is a reference image in the direction from the lower right part to an upper left part by using the L image as a standard image, and acquires distribution statistics of disparities for each predetermined small region (S23). The input image interpolation circuit 21 outputs the reference image which is an input image as an interpolation image without performing an image expansion process, and thus an interpolation image which is a cost calculation target is the R image itself.

In this case, the cost optimization calculation circuit 16 calculates costs only in paths in which the costs can be calculated while scanning the pixels in the direction from the lower left part to the upper right part. In other words, costs in four paths along four directions of being aggregated from a horizontal right direction, a vertical lower direction, a lower right direction of 45 degrees, and a lower left direction of 45 degrees are calculated, and the combined cost value S is calculated by using the costs in the four paths.

Disparities causing the combined cost value S to be the minimum are extracted for all pixels of the standard image, so as to be stored in the crosscheck buffer 18 and be also output to the disparity output circuit 19. The disparity output circuit 19 outputs the disparities for all of the pixels of the standard image to the intensive disparity range determination circuit 23 as disparity standards. The intensive disparity range determination circuit 23 divides the standard image into small regions on the basis of a predetermined logic. Distribution statistics of the disparity standards for pixels included in a region are acquired for each small region.

Next, the intensive disparity range determination circuit 23 determines a disparity intensive retrieval pixel position at which intensive retrieval is performed (for example, a disparity median), for each small region, on the basis of the distribution statistics of the disparity standards acquired in S23 (S24). The control circuit 20 sets a scanning direction in each of the input image acquisition circuit 14, the input image interpolation circuit 21, the cost-value calculation circuit 15, the cost optimization calculation circuit 16, and the cost minimum disparity extraction circuit 17 such that pixels are scanned in the direction from the upper left part to the lower right part (S25).

Each of the input image acquisition circuit 14, the input image interpolation circuit 21, the cost-value calculation circuit 15, the cost optimization calculation circuit 16, and the cost minimum disparity extraction circuit 17 calculates a disparity while scanning an interpolation image in the direction from the upper left part to the lower right part (S26). S26 is executed as follows, specifically.

First, the input image interpolation circuit 21 generates an interpolation image of the reference image (that is, the R image) received from the input image acquisition circuit 14 in response to an instruction from the intensive disparity range determination circuit 23. Since a disparity intensive retrieval pixel position differs depending on a disparity computation target pixel, an instruction corresponding to a disparity computation target pixel is received from the intensive disparity range determination circuit 23, and an interpolation image is generated, whenever the disparity computation target pixel is set to the next pixel.

Next, the cost-value calculation circuit 15 sets a cost value calculation pixel region for a disparity computation target pixel in the interpolation image, and calculates a cost value in the region. Next, the cost optimization calculation circuit 16 calculates the combined cost value S. In this case, the cost optimization calculation circuit 16 calculates costs only in paths in which the costs can be calculated while scanning the pixels in the direction from the upper right part to the lower right part. In other words, costs in four paths along four directions of being aggregated from a horizontal left direction, a vertical upper direction, an upper right direction of 45 degrees, and an upper left direction of 45 degrees are calculated, and the combined cost value S is calculated by using the costs in the four paths. The cost minimum disparity extraction circuit 17 extracts disparities causing the combined cost value S to be the minimum.

Finally, the disparity calculated in S26 is corrected by using data (for example, data regarding a correspondence relationship between a pixel position in a correction image and a pixel position in the reference image) stored in the disparity interval information memory 24 in S24, and is converted into a disparity in the standard image so as to be output (S27), and the disparity calculation process is finished.

As mentioned above, according to the present embodiment, when the combined cost value S is obtained by scanning an image a plurality of times, and a disparity is calculated, such as the SGM method, a range in which a disparity is intensively retrieved in later scanning is determined on the basis of a disparity calculated in previous scanning (disparity standard). Therefore, it is possible to acquire a disparity standard without adding a processing circuit or calculation. When a disparity is calculated in later scanning, pixels near a disparity standard are finely extracted, and pixels far from the disparity standard are discretely extracted, so that cost calculation is performed, and thus it is possible to improve the accuracy of calculation of a disparity while preventing an increase in a computation amount.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
   a calculation circuit configured to calculate disparities of pixels in a first image relative to corresponding pixels in a second image, the first and second images including an object, the disparities including a first disparity of a first pixel in the first image relative to a second pixel in the second image corresponding to the first pixel;
   an interpolation circuit configured to generate a first interpolated image of the first image;
   a determination circuit configured to determine, based on the disparities, a part of pixels of the first interpolated image as target pixels from which the calculation circuit determines a pixel in the first interpolated image corresponding to the second pixel and then calculates a second disparity of the second pixel relative to a corresponding pixel in the first image; and an output circuit configured to generate a corrected disparity based on a difference between the first disparity and the second disparity, for distance calculation to the object.

2. The image processing apparatus according to claim 1, wherein
the first image is captured by a first camera and the second image is captured by a second camera, and
the interpolation circuit is configured to generate the first interpolation image by increasing a resolution of the first image in a direction in which the first and second cameras are aligned.

3. The image processing apparatus according to claim 1, wherein
the calculation circuit comprises a cost optimization calculation circuit configured to perform cost optimization calculation to determine the second pixel corresponding to the first pixel and the pixel in the first interpolated image corresponding to the second pixel.

4. The image processing apparatus according to claim 3, wherein
the calculation circuit is configured to calculate the first and second disparities by using a cost value obtained through the cost optimization calculation.

5. The image processing apparatus according to claim 3, wherein
the cost optimization calculation is performed according to calculation of a combined cost value based on an SGM method.

6. The image processing apparatus according to claim 3, further comprising:
a control circuit configured to set a direction for selecting one of the target pixels to a first direction or a second direction opposite to the first direction, and calculate a cost value for each of the target pixels in the first interpolated image in the set direction.

7. The image processing apparatus according to claim 6, wherein
the first and second directions each correspond to a raster scanning order,
the first direction is a direction directed from a lower right part of an image to an upper left part of the image, and
the second direction is a direction directed from the upper left part of the image to the lower right part of the image.

8. The image processing apparatus according to claim 1, wherein
the calculation circuit is further configured generate distribution statistics of the disparities and determine the target pixels based on the distribution statistics, the distribution statistics including at least one of average values, peak values, maximum likelihood values, and medians of the disparities in each of a plurality of regions of the first image.

9. A method for determining a distance to an object, the method comprising:
acquiring first and second images containing the object;
calculating disparities of pixels in the first image relative to corresponding pixels in the second image, the disparities including a first disparity of a first pixel in the first image relative to a second pixel in the second image corresponding to the first pixel;
generating a first interpolated image of the first image;
based on the disparities, determining a part of pixels of the first interpolated image as target pixels and determining, from the target pixels, a pixel in the first interpolated image corresponding to the second pixel;
calculating a second disparity of the second pixel relative to a corresponding pixel in the first image;
generating a corrected disparity based on a difference between the first and second disparities; and
determining the distance to the object using the corrected disparity.

10. The method according to claim 9, wherein
the first image is captured by a first camera and the second image is captured by a second camera, and
the first interpolated image is generated by increasing a resolution of the first image in a direction in which the first and second cameras are aligned.

11. The method according to claim 9, further comprising:
performing cost optimization calculation, wherein the second pixel corresponding to the first pixel and the pixel in the first interpolated image corresponding to the second pixel are determined based on the cost optimization calculation.

12. The method according to claim 11, wherein
the first and second disparities are calculated by using a cost value obtained through the cost optimization calculation.

13. The method according to claim 11, wherein
the cost optimization calculation is performed according to calculation of a combined cost value based on an SGM method.

14. The method according to claim 11, further comprising:
setting a direction for selecting one of the target pixels to a first direction or a second direction opposite to the first direction; and
calculating a cost value for each of the target pixels in the first interpolated image in the set direction.

15. A driving assistance system comprising:
one or more sensors configured to acquire first and second images that include an object; and
an image processing apparatus comprising:
a calculation circuit configured to calculate disparities of pixels in the first image relative to corresponding pixels in the second image, the disparities including a first disparity of a first pixel in the first image relative to a second pixel in the second image corresponding to the first pixel;
an interpolation circuit configured to generate a first interpolated image of the first image;
a determination circuit configured to, based on the disparities, determine a part of pixels of the first interpolated image as target pixels from which the calculation circuit determines a pixel in the first interpolated image corresponding to the second pixel and then calculates a second disparity of the second pixel relative to a corresponding pixel in the first image; and
an output circuit configured to generate a corrected disparity based on a difference between the first disparity and the second disparity and output the corrected disparity for distance calculation to the object.

16. An image processing apparatus comprising:
a memory configured to store first and second images that include an object; and a processor configured to:
- calculate disparities of pixels in the first image relative to corresponding pixels in the second image, the disparities including a first disparity of a first pixel in the first image relative to a second pixel in the second image corresponding to the first pixel;
- generate a first interpolated image of the first image;
- based on the disparities, determine a part of pixels of the first interpolated image as target pixels and determine, from the target pixels, a pixel in the first interpolated image corresponding to the second pixel;
- calculate a second disparity of the second pixel relative to a corresponding pixel in the first image; and
- generate a corrected disparity based on a difference between the first disparity and the second disparity, for distance calculation to the object.

* * * * *